United States Patent
Denli et al.

(10) Patent No.: US 10,416,348 B2
(45) Date of Patent: Sep. 17, 2019

(54) SHAPE-BASED GEOPHYSICAL PARAMETER INVERSION

(71) Applicant: ExxonMobil Research and Engineering Company, Annandale, NJ (US)

(72) Inventors: Huseyin Denli, Basking Ridge, NJ (US); Jeremy S. Brandman, Maplewood, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 24 days.

(21) Appl. No.: 15/492,316

(22) Filed: Apr. 20, 2017

(65) Prior Publication Data
US 2017/0336529 A1  Nov. 23, 2017

Related U.S. Application Data

(60) Provisional application No. 62/339,331, filed on May 20, 2016.

(51) Int. Cl.
*G01V 11/00* (2006.01)
*G01V 99/00* (2009.01)

(52) U.S. Cl.
CPC .......... *G01V 11/00* (2013.01); *G01V 99/005* (2013.01); *G01V 2210/66* (2013.01)

(58) Field of Classification Search
CPC ... G01V 99/005; G01V 11/00; G01V 2210/66
See application file for complete search history.

(56) References Cited

U.S. PATENT DOCUMENTS

| | | | |
|---|---|---|---|
| 6,480,790 B1 | 11/2002 | Calvert et al. | |
| 8,363,509 B2 | 1/2013 | Colombo et al. | |
| 9,121,964 B2 | 9/2015 | Lewis et al. | |
| 9,158,017 B2 | 10/2015 | Shin | |
| 9,453,929 B2 * | 9/2016 | Schmedes | G01V 11/00 |
| 2011/0115787 A1 | 5/2011 | Kadlec | |

(Continued)

FOREIGN PATENT DOCUMENTS

WO      201305074 A1    7/2013

OTHER PUBLICATIONS

Abubakar et al., "Joint inversion approaches for geophysical electromagnetic and elastic full-waveform data", Inverse Problems, 2012, pp. 05516-, vol. 28, IOP Publishing.

(Continued)

*Primary Examiner* — Bryan Bui
(74) *Attorney, Agent, or Firm* — Andrew T. Ward; Priya G. Prasad

(57) ABSTRACT

Inversion techniques are provided for imaging subsurface regions from geophysical data sets. The inversion techniques provide a geophysical data set containing data measured from a subsurface region to an objective function. These techniques further optimize the objective function to invert for an implicitly represented geologic structure of the subsurface region and at least one geophysical parameter of the subsurface region. In addition, the inversion techniques use a computer system to present results produced by the objective function optimization.

19 Claims, 24 Drawing Sheets

(56) References Cited

U.S. PATENT DOCUMENTS

| | | | |
|---|---|---|---|
| 2011/0255371 A1* | 10/2011 | Jing | G01V 1/28 367/73 |
| 2012/0143506 A1* | 6/2012 | Routh | G01V 1/282 702/2 |
| 2013/0185040 A1 | 7/2013 | Starr et al. | |
| 2014/0001751 A1 | 1/2014 | Christian, Jr. et al. | |
| 2014/0180593 A1 | 6/2014 | Schmedes et al. | |

OTHER PUBLICATIONS

Bourdin, "The variational formulation of brittle fracture: numerical implementation and extensions", IUTAM Symposium on discretization methods for evolving discontinuities, 2007, pp. 381-393, Springer.

Haber et al., "Model fusion and joint inversion", Surveys in Geophysics, 2013, pp. 675-695, vol. 34, Springer.

Lu et al., "A local level-set method for 3-D inversion of gravity-gradient data", Geophysics, 2015, pp. G35-G51, vol. 80, No. 1, Society of Exploration Geophysicists.

Muharramov et al., "Multi-model full-waveform inversion", Cornell University Library, Oct. 26, 2014, pp. 1-6, arXiv:1410.6997.

Mumford et al., "Optimal approximations by piecewise smooth functions and associated variational problems", Communications on Pure and Applid Mathematics, Jul. 1989, pp. 577-685, vol. 42, Wiley Online Library.

Parker, "The rapid calculation of potential anomalies", Geophysical Journal International astr. Soc., Aug. 4, 1972, pp. 447-455, vol. 31, Wiley Online Library.

Versteeg, "The Marmousi experience: Velocity model determination on a synthetic complex data set", The Leading Edge,1994, pp. 927-936, vol. 1, iss. 3, Society of Exploration Geophysicists.

Vese et al., "A Multiphase Level set framework for image segmentation using the Mumford and Shah model", International Journal of Computer Vision, 2002, pp. 271-293, vol. 50, iss.3, Kluwer Academic Publishers.

Zhao, "A fast sweeping method for Eikonal equations", Mathematics of Computation, May 21, 2004, pp. 603-627, vol. 74, No. 250, American Mathematical Society.

Gazit et al., "Joint Inversion through a level set formulation", 22nd International Geophyscial Conference and Exhibition, Brisbane, Australia, 2012.

Guo et al., "Shape optimization and level set method in full waveform inversion with 3D body reconstruction", SEG Technical Program Extended Abstract, 2013, Society of Exploration Geophysicists.

Rondi et al., "Enhanced electrical impedance tomography via the Mumford-Shah functional", ESAIM: Control, Optimixation and Calculus of Variations, Jul. 2001, pp. 517-538, vol. 6, EDP Sciences, SMAI.

Bunks et al., "Multiscale seismic waveform inversion", Geophysics, 1995, pp. 1457-1473, vol. 60, iss. 5, Society of Exploration Geophysicists.

Bellettini et al., "Discrete approximation of a free discontinuity problem", Numerical Functional Analysis Optimization, 1994, pp. 201-224, vol. 15, iss. 304, Marcel Dekker, Inc.

Ambrosio et al., "On the approximation of free discontinuity problems", Bollettino della Unione Matemàtica Italiana, Boll. Un. Mat. Ital. 6-B, 1992, pp. 105-123, vol. VI-B, No. 1, IDAM Research Fellowship, Francesco Severi at Scoula Normale Superiore, Pisa.

Abubaker et al., "Inversion algorithms for large-scale geophysical electromagnetic measurements", Inverse Problems, 2009, pp. 1-30, vol. 25, IOP Publishing.

Chen, "Phase-field models for microstructure evolution", Annual Review of Material Research, Aug. 2002, pp. 113-140, Annual Reviews.

Deckelnick et al., "Double obstacle phase field approach to an inverse problem for a discontinuous diffusion coefficient", Inverse Problems, pp. 1-26, vol. 32, No. 4, IOP Publishing.

Hackl, "Geometry Variations, Level Set and Phase-field Methods for Perimeter Regularized Geometric Inverse Problems", Ph.D. thesis, Johannes Kepler Universitat, Linz, 2006.

Osher et al., "Fronts Propagating with Curvature Dependent Speed: Algorithms based on Hamilton-Jacobi Formulations", Journal of Computational Physics, 1988, pp. 12-49, vol. 79, iss. 1, Elsevier, ScienceDirect.

Brett et al., "Phase field methods for binary recovery", Hoppe, R., ed., Optimization with PDE constraints,Aug. 8, 2014, pp. 25-63, Springer.

Derfoul, et al., "Image Processing Tools for Better Incorporation of 4D Seismic Data Into Reservoir Models", Journal of Computational and Applied Mathematics, 2013, vol. 240, pp. 111-122.

Fleck, et al., "On Phase-Field Modeling With a Highly Anisotropic Interfacial Energy", The European Physical Journal Plus, 2011, vol. 126, pp. 1-11.

Vitti, "The Mumford-Shah Variational Model for Image Segmentation: An Overview of the Theory, Implementation and Use", ISPRS Journal of Photogrammetry and Remote Sensing, 2012, vol. 69, pp. 50-64.

Zhu, et al., "Improved Estimation of P-Wave Velocity, S-Wave Velocity, and Attenuation Factor by Iterative Structural Joint Inversion of Crosswell Seismic Data", Journal of Applied Geophysics, 2015, vol. 123, pp. 71-80.

The International Search Report and Written Opinion of PCT/US2017/028545 dated Nov. 23, 2017.

* cited by examiner

SHAPE-BASED GEOPHYSICAL PARAMETER INVERSION

CROSS-REFERENCE TO RELATED APPLICATIONS

This application claims the benefit of U.S. Provisional Application No. 62/339,331, filed on May 20, 2016, the entire contents of which are incorporated herein by reference.

BACKGROUND

The present disclosure relates to imaging of geophysical subsurface features such as sedimentary layers, salt anomalies, and barriers. Specifically, the present disclosure relates to an inversion technique that provides high-fidelity images of subsurface regions from geophysical data sets.

Geophysical inversion generally involves determining values of at least one geophysical parameter of a subsurface region (e.g., wave speed/velocity, permeability, porosity, electrical conductivity, and density) in a manner which is consistent with at least one geophysical data set acquired at locations remote from the region (e.g., seismic, time-lapse seismic, electromagnetic, gravity, gradiometry, well log, and well pressure measurements).

Geophysical inversion is often carried out through the minimization of an objective function which includes a least-squares data misfit and a regularization term (Parker, 1994). Such an objective function typically takes the form $$J(\kappa) = \int_M \|u(\kappa) - \bar{u}\|^2 dx + R(\kappa), \quad (1)$$

where $\kappa$ represents the unknowns to be determined through optimization, $\bar{u}$ is the measured geophysical data, $u(\kappa)$ is data computed during the optimization according to a mathematical model, M denotes the locations at which the data is measured, $\|\cdot\|$ is an arbitrary norm used to quantify the error or misfit between the computed data $u(\kappa)$ and the measured data $\bar{u}$, and $R(\kappa)$ is a regularization term (e.g. Tikhonov regularization) used to stabilize the inversion.

Although the true physical parameter $\kappa$ is a spatially varying function defined at every point of a subsurface domain $\Omega$, $\kappa$ is typically discretized, for computational purposes, when optimizing the objective function $J(\kappa)$. Such a discretization typically amounts to first partitioning the subsurface domain $\Omega$ into disjoint cells $\Omega_i$, such that $\Omega = \cup \Omega_i$, and then setting $\kappa(x) = \kappa_i$ for $x \in \Omega_i$. One example of such a partitioning into cells is a regular Cartesian grid. The parameter values $\{\kappa_i\}$ are determined by optimizing equation (1) using a gradient-based optimization technique such as Gauss-Newton, quasi-Newton, or steepest descent. Henceforth, this approach will be referred to as the cell-based (or cell-by-cell) inversion technique (Aster, 2013).

For certain problems, such cell-based inversion techniques fail to demonstrate robust, high-fidelity performance when imaging subsurface regions. This is often because the objective function is ill-posed or under-constrained, in which case there may not be a unique solution to the objective function or the solution may be very sensitive to noise in the acquired geophysical data set. Regularization is often included in equation (1) in order to address these issues, but state-of-the-art regularization methods may introduce into the inversion, artifacts such as unnecessary smoothing. Moreover, this non-uniqueness becomes more severe when inverting for multiple distinct physical parameters (e.g., wave speed and density), making inversion particularly problematic in such cases.

One possibility for reducing the non-uniqueness present in multi-parameter inversion is to require that different physical parameters be structurally consistent. Structural consistency of two parameters means that the parameters share a common set of interfaces across which they change abruptly. Many geologic parameters, such as wave speed and density, exhibit such a relationship. However, despite the prevalence of such examples, conventional inversion techniques, as described above, cannot ensure that such a criterion is satisfied.

Therefore, for geophysical inverse problems requiring the determination of values of multiple parameters, additional steps must be taken in order to ensure that inverted values for the parameters are structurally consistent. One approach for doing this is to link the different parameters through geophysical or empirical relationships (e.g., Archie's law) and invert for a minimal subset of the parameters. When well-known relationships between parameters are available, this approach has great appeal. However, such relationships are, in many cases, either poorly understood or unknown completely, rendering this approach of limited value.

Another approach, known as the cross-gradient approach, inverts for two distinct physical parameters by introducing an additional term into the objective function which penalizes gradients that are not collinear. As a result, the cross-gradient approach encourages structural consistency, but it does not strictly enforce it. In addition, it is unclear how this approach generalizes to an arbitrary number of different physical parameters.

A third inversion methodology, which does ensure structural consistency, uses level-set functions to represent interfaces between subsurface regions. This approach has been applied to inverse problems such as full-wavefield inversion, gravity inversion, magnetic inversion, and reservoir history matching. However, due to the nature of the level-set representation, it is unclear how effective this approach will be for problems with a large number of distinct subsurface regions that contain possibly heterogeneous parameter values.

In light of the above described drawbacks of existing geophysical inversion techniques, the inventors recognized a need in the art to develop alternative geophysical inversion techniques that overcome or improve upon such limitations.

DETAILED DESCRIPTION

Figure 1A:
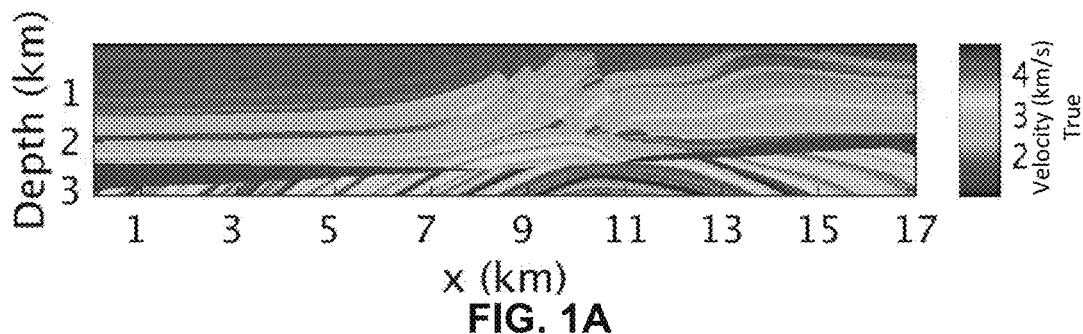
FIGS. 1A-1D illustrate the performance of an inversion technique, according to an embodiment of the present disclosure.

Embodiments of the present disclosure provide inversion methods for imaging subsurface regions from geophysical data sets.

A first method may comprise the steps of providing at least one geophysical data set containing data measured from a subsurface region to an objective function; optimizing the objective function to invert for a geologic structure of the subsurface region and at least one geophysical parameter of the subsurface region; and using a computer system to present results produced by the objective function optimization.

A second method may comprise the steps of providing at least one geophysical data set containing data measured from a subsurface region to a Mumford-Shah-based objective function; optimizing the Mumford-Shah-based objective function to invert for at least one of the following: a geologic structure of the subsurface region and at least one geophysical parameter of the subsurface region; and using a computer system to present results produced by the Mumford-Shah-based objective function optimization.

A third method may comprise the steps of providing at least one geophysical data set containing data measured from a subsurface region to an objective function; applying a phase-field functional to optimize the objective function and invert for at least one of the following: a geologic structure of the subsurface region and at least one geophysical parameter of the subsurface region; and using a computer system to present results produced by the objective function optimization.

As discussed in the background section, conventional purely cell-based inversion techniques suffer from the fact that, for many inverse problems, there exist multiple choices of parameter values which are consistent with the measured data. This non-uniqueness is particularly pronounced when inverting for multiple physical parameters simultaneously (e.g., wave speed/velocity, permeability, porosity, electrical conductivity, and density). In addition, pure cell-based inversions, by definition, do not determine sharp boundaries that are actually associated with geologic features but rather parameter values in individual cells. As a result, the inversion produces blurred or soft images of geologic structures such as facies, geobodies and stratigraphic layers. Blurring is sufficiently large that identification of key geologic features is left to manual interpretation or application of additional algorithms. The present invention overcomes this limitation by using shapes or geobodies rather than cells as a fundamental geometric element in the inversion. This fundamental geometric element more naturally matches the way in which the geology of the crust of the earth is organized. It is well recognized that the crustal structure of the earth has well defined facies between rock layers. Horizons can be readily identified and depositional sequences can be described using sequence stratigraphy.

Throughout this document, the terms shape, geologic structure, and geobody will be interchangeably used to refer to a three dimensional portion of the subsurface which is part of a single facies or part of a single stratigraphic layer. Examples of such features include, but are not limited to, salt bodies, shale layers, sandstone formations, and carbonate platforms and hydrocarbon reservoirs. Within a single shape, geologic structure or geobody, physical rock matrix parameters such as the compressibility, permeability, density, and electric conductivity, have an average value that can have some degree of variance. The fluid saturation in the layers can have significantly more variance (for example if an oil reservoir has a gas cap). If the fluid variance is sharp and large enough to significantly affect the average electric properties, seismic properties, or in some cases the fluid transport properties of the rock, the region with the altered fluid composition can be treated as a separate geobody.

Throughout this document, the term interface refers to those subsurface locations at the boundary between two shapes. For example, there exists an interface separating different sedimentary layers. At an interface between shapes, it is to be expected for at least one geophysical parameter value κ (such as wave speed, density, compressibility, electrical conductivity, permeability, fluid saturation) to change in an abrupt or discontinuous manner. It is assumed herein that the subsurface region of interest is equal to the union of subsurface shapes and interfaces. The term geologic feature is used to refer to either a shape or an interface.

The present disclosure describes embodiments that can either:

(1) simultaneously invert geophysical data for interfaces or shapes along with subsurface parameter values
(2) invert geophysical data for geologic features based on knowledge of parameter values,
(3) or invert geophysical data for parameter values based on knowledge of geologic features.

Inverting for geologic features, in addition to geophysical parameters, provides at least three distinct benefits over cell-based inversion methods. First, inversion of interfaces enables inversion results to be structurally consistent. Throughout this document, the term structurally consistent inversion refers to an inversion of multiple geophysical parameters (e.g. wave speed and density) in which the different parameter types possess a common set of shapes along with a common set of interfaces at which parameter values may change sharply or discontinuously. A structurally consistent inversion is desirable because many geophysical parameters, such as wave speed and density, can satisfy a well-defined relationship compatible with structural consistency. Hence, it is expected that the inversion of geologic features along with geophysical parameters will provide a result of greater fidelity than an inversion of geophysical parameters alone. The second benefit of inverting for features, in addition to geophysical parameters, is that it can reduce the number of degrees of freedom to be inverted for which, in turn, can reduce the non-uniqueness and ill-posedness common to inverse problems. For example, when inverting seismic data to locate an anomaly of constant wave speed, the traditional cell-based inversion approach would invert for each cell separately, not taking into account the knowledge that many of the cells should share the same wave speed value. In contrast, a shape-based inversion approach, which inverts for the shape of the anomaly, the constant wave speed inside the anomaly, and the background wave speed, reduces the number of degrees of freedom by taking advantage of our knowledge of the homogeneity of the anomaly. A third benefit of inverting for features, in addition to geophysical parameters, is that the features themselves (e.g. the locations of different sedimentary layers, the location of a salt body) are often of intrinsic value. Automatic identification of these layers eliminates manual identification or application of additional algorithms.

Any method which inverts for geologic features must have a means of representing such features. One common technique is to discretize the boundary points of the shape under consideration and to consider these boundary points as variables to be inverted for. In this framework, the discretized boundary points represent inversion variables in the same way as cell-based parameter values represent inversion variables in the cell-based inversion approach. This technique for the movement of shapes is known by several names, including the marker particle method and the string method. The marker/string method suffers from two shortcomings in the presence of large changes of shapes (Osher, 1988, volume 79). First, marker particles merge in regions with high curvature, which can lead to unstable numerical behavior (Abubakar, 2009 (25)). Second, topological changes, such as the merging of two shapes, require the inclusion of additional steps into the algorithm which can complicate the overall procedure and impact the quality of the result.

This limitation can be overcome in geophysical inversion problems by using implicit methods, in which shapes are described implicitly through the use of one or more auxiliary functions defined on a predetermined cellular grid (e.g. a Cartesian grid). While the maker/string method explicitly tracks points on the boundary of a shape, implicit methods determine which points belong to a shape based on the values of one or more auxiliary functions. In contrast with marker/string methods, implicit methods naturally handle merging and breaking of shapes, as well as regions of high curvature, without any change in algorithm, discretization, or grid.

Two commonly used implicit methods are the phase-field method and the level set method. Both techniques have been demonstrated on a broad range of physically realistic problems involving the motion of interfaces or shapes. However, the two methods differ in terms of how exactly they represent shapes and the mechanism by which these interfaces or shapes are updated. The phase-field method (Deckelnic, 2005) represents and moves shapes using a function which is equal, approximately, to one inside of the shape and equal, approximately, to negative one outside of the shape. In addition, there is a narrow transition layer where the function transitions between the values of one and negative one. Because the phase field technique does not explicitly identify the boundary of the shape, it is known as a diffuse interface method. In contrast, the level set method (Osher, 1988, volume 79) is a sharp interface method, in that it represents the boundary of a shape as the zero level-set of a function. One example of a level set function is the signed distance to the boundary of a shape.

In one aspect of this invention, two inversion techniques have been developed which determine both geologic features and subsurface parameter values. The Mumford-Shah-based inversion technique simultaneously inverts for interfaces and geophysical parameters κ. In practice, interfaces are implicitly represented in Mumford-Shah; methods for achieving this include the Ambrosio-Tortorelli approximation, which is essentially an extension of phase field, and the Chan-Vese level set approach. The phase-field inversion technique inverts for geologic shapes and a parameter field κ obeying a pre-determined trend (e.g., piecewise constant or piecewise linear). The Mumford-Shah-based inversion technique is more general in that it can capture an arbitrary number of interfaces along with heterogeneous κ fields. In contrast, the phase-field inversion requires the user to specify the maximum number of shapes in advance, along with expected trend behavior (e.g. linear or quadratic) of each parameter. Which method is appropriate for a given problem depends on what is known in advance regarding the geophysical parameters of interest and the information content of the measured data. The feature-based geophysical inversion techniques are applicable to geophysical inverse problems have been introduced previously in nonrelated scientific disciplines. The Mumford-Shah functional was originally introduced in image processing for the segmentation of images (Mumford, 1989). The phase-field technique has traditionally been used in materials science and physics to describe phase transitions and other interfacial phenomena (Chen, 2002).

The successful application of Mumford-Shah and phase-field to geophysical inversion is not obvious for several reasons. First, the forward models used in geophysics (e.g. wave propagation, gravitational and electromagnetic fields, flow in porous media) are quite different from those used in previous applications of these feature-based inversion techniques. Second, incorporation of Mumford-Shah or phase field into geophysical inversion leads to significant changes in the objective function to be minimized. The reason for these changes is that, in contrast to a cell-based inversion, the Mumford-Shah and phase field inversion techniques determine both interfaces or shapes and parameter values. As a result, these techniques require computational techniques to efficiently and robustly represent and move interfaces or shapes. The discovery that this can be robustly done is a component of the present invention. In the context of the Mumford-Shah inversion technique, interfaces for geophysical problems can be represented using either the Ambrosio-Tortorelli approximation, which is an extension of the phase field method, or the Chan-Vese level set approach. In the context of the phase field inversion technique, the phase field representation of interfaces described above provides the requisite robustness. The incorporation of these implicit techniques for representing interfaces into geophysical inversion introduces additional complexity and, in some cases, additional non-convexity. As a result, a priori it would not be clear how applicable and reliable traditional geophysics optimization strategies would be in the context of Mumford-Shah and phase-field inversion. The third reason that the successful application of Mumford-Shah and phase-field inversion techniques is not obvious is that, a priori, it is not clear how robust these technique are to realistic geophysical noise.

The inversion algorithms presented here offer several novelties in comparison with the prior art in shape-based geophysical inversion (Starr, 2015) (Abubakar, 2009 (25)) (Hobro, Patent application WO2013105074 A1). First, the inversion algorithms presented here, based on implicit interface or shape representations, determine shapes and parameter values within those shapes through an optimization procedure. Prior implicit shape-based geophysical inversion techniques assumed the parameter values to be known and did not invert for them. Second, our implicit representation of shapes and interfaces is different from the prior art. Third, the Mumford-Shah inversion algorithm enables the user to determine an arbitrary number of interfaces through the inversion process. Prior shape-based geophysical inversion techniques, such as the level-set method, required the number of interfaces to be prescribed in advance. Fourth, gradient-based optimization techniques developed for the cell-based inversion, described by equation (1), are easily adapted to the shape-based algorithms. In contrast, the prior art requires additional steps in order to utilize cell-based optimization methods based on gradient information.

Inversion results using the Mumford-Shah and phase-field inversion techniques are ultimately presented on a computer system for use in business decisions. This means that a digital map will be made of both parameter values and geologic features, as determined by the inversion algorithm. Such a digital map will likely enable enhanced decision-making in business areas such as exploration, drilling, and reservoir management.

According to an embodiment of the present disclosure, a Mumford-Shah-based inversion technique determines subsurface structures that are consistent with at least one geophysical data set and at least one parameter. The geophysical data sets may include, but are not limited to, seismic, time-lapse seismic, electromagnetic, gravity, gradiometry, well log, and well pressure data, measured by one or more receivers. The geophysical parameters $\kappa$ may include, but are not limited to, wave speed/velocity, permeability, porosity, electrical conductivity, and density of the subsurface region of interest.

To invert for values of at least one parameter $\kappa$ from at least one data set, the Mumford-Shah-based inversion technique decomposes the subsurface region of interest into distinct shapes separated by interfaces. These interfaces, along with the values of the at least one parameter $\kappa$ within each of the shapes, may be determined by optimizing an objective function E. The objective function E is $$E(\kappa,\Gamma)=\int_M \|u(\kappa)-\bar{u}\|^2 dx + MS(\kappa,\Gamma), \quad (2)$$

where $\kappa$ and $\Gamma$ are the unknowns to be determined through the optimization, with $\kappa$ being values of the at least one parameter and $\Gamma$ consisting of the set of interfaces separating the shapes. $\bar{u}$ is the measured geophysical data from the at least one data set and $u(\kappa)$ is data computed by a forward model (e.g. elastic wave propagation, gravitational attraction, electrical wave propagation, flow in porous media) during the optimization of the objective function E. The operator $\|\cdot\|$ is an arbitrary norm used to quantify the error or misfit between the computed data $u(\kappa)$ and the measured geophysical data $\bar{u}$. M is a domain describing spatial locations of the measured geophysical data $\bar{u}$. The data misfit term $\int_M \|u(\kappa)-\bar{u}\|^2 dx$ ensures that the inferred values $\kappa$ for the at least one parameter are consistent with the measured geophysical data $\bar{u}$. The minimization of equation (2) can be performed in any spatial dimension (e.g. n=2,3). It should be noted that providing geophysical data $\bar{u}$ to equation (2) is an example of providing at least one geophysical data set containing data measured from the subsurface region to an objective function.

In equation (2), the function MS is known as the Mumford-Shah functional. The Mumford-Shah functional MS is used to partition the subsurface region of interest into shapes, enforce some degree of homogeneity (i.e., smoothness) of $\kappa$ within each shape, and control the complexity of the interface set $\Gamma$. The Mumford-Shah functional MS is represented by equation (3).

$$MS(\kappa,\Gamma)=\alpha\int_{\Omega/\Gamma} F(\kappa)dx + \beta\int_\Gamma \|t(s)\|_\Gamma ds \quad (3)$$

In equation (3), the spatial domain $\Omega$ represents the subsurface region of interest, F is a regularization function within each of the shapes of the subsurface, t(s) is a tangent vector at the interface set $\Gamma$, and the operator $\|\cdot\|_\Gamma$ is an arbitrary norm, potentially anisotropic, used to measure arclength on $\Gamma$. The regularization function F may be formulated to be the square of the absolute of the gradient of values $\kappa$ of the at least one parameter, as in equation (4). With the regularization function F set as in equation (4), the first term on the right hand side of equation (3) ensures that the values κ of the at least one parameter vary smoothly within each shape, except at the interface set Γ. The second term on the right hand side of equation (3) measures arclength and as such penalizes oscillations of the interface set Γ. In equation (3), the constant α controls the homogeneity of parameter values within each shape and the constant β controls the complexity of the interface set Γ.

$$F(\kappa) = |\nabla \kappa|^2 \quad (4)$$

The search for a minimizing pair (κ, Γ) of the objective function E is generally non-trivial due to the potential complexity of the interface set Γ. Two approaches for computing the Mumford-Shah functional MS, discussed below, highlight different geometric techniques for representing Γ implicitly on a computer.

One approach, applicable when the Euclidean norm is used to measure arclength, is to use the Ambrosio-Tortorelli approximation $MS_\epsilon$, which is represented by equation (5).

$$MS_\epsilon(\kappa, \phi) = \alpha \int_\Omega \phi^2 F(\kappa) dx + \beta \int_\Omega \left( \epsilon |\nabla \phi|^2 + \frac{(\phi-1)^2}{4\epsilon} \right) dx \quad (5)$$

The Ambrosio-Tortorelli approximation $MS_\epsilon$ replaces the minimizing pair (κ, Γ) by a minimizing pair ($\kappa_\epsilon$, $\phi_\epsilon$). It can be shown that, for $\epsilon \ll 1$, $MS_\epsilon(\kappa_\epsilon, \phi_\epsilon) \approx MS(\kappa, \Gamma)$, $\kappa_\epsilon \approx \kappa$ represents values approximating the values κ of the at least one parameter, and $\phi_\epsilon$ is a function such that $\phi_\epsilon \approx 1$ except in a boundary layer of thickness $O(\epsilon)$ near the boundary set Γ, where $\phi_\epsilon \approx 0$. Hence, the location of the interface set Γ may be determined from knowledge of the values of $\phi_\epsilon$. The Ambrosio-Tortorelli approximation of the Mumford-Shah functional is valid in any spatial dimension.

In order to perform Mumford-Shah inversion and minimize equation (2), using the Ambrosio-Tortorelli approximation given by equation (5), it is important to first discretize the parameters κ, the function φ, and the integration and differentiation operators in equation (5) on a grid. The mesh size h of this grid must be much smaller than ε (i.e., h≪ε), in order to numerically resolve the boundary layer of $\phi_\epsilon$ near the interface set Γ and ensure convergence of the Ambrosio-Tortorelli approximation $MS_\epsilon$ to the Mumford-Shah functional MS. Given such a discretization of κ and φ, optimization may be performed for cell-based values of κ and φ using a gradient-based optimization method such as Gauss-Newton, quasi-Newton, or steepest descent. The interface set Γ is determined from cell values of $\phi_\epsilon$.

The optimization procedure described above amounts to the determination of cell-based values of κ and φ which minimize the objective function (2) using the approximation (5). On a formal level, this procedure resembles the traditional cell-based inversion approach. However, the results of the Mumford-Shah and cell-based inversion strategies can differ significantly due to differences in the objective functions for these two techniques. This difference is due to the regularization technique used by each method. For example, cell-based inversion using first-order Tikhonov regularization (i.e. $R(\kappa) = \int_\Omega |\nabla \kappa|^2 dx$) leads to parameter values κ which are uniformly smooth. In contrast, Mumford-Shah inversion based on equations (2), (4), and (5) enforces smoothness of κ only within individual shapes.

Another approach to approximating the Mumford-Shah functional MS is the Chan-Vese level-set approach. While the Ambrosio-Tortorelli approximation minimizes a functional $MS_\epsilon$ approximating the original Mumford-Shah functional MS, the Chan-Vese level-set approach instead directly optimizes for the interface set Γ along with a constant parameter value associated with each shape determined by Γ. The Chan-Vese approach carries out this optimization by representing interfaces and shapes with a vector level-set function, which is then optimized along with piecewise constant parameter values for each shape.

FIGS. 1A-1E illustrate, according to an embodiment of the present disclosure, the ability of the Mumford-Shah inversion technique to segment an image into a large number of shapes and interfaces. Strictly speaking, no inversion is performed here. This example also highlights how the variability of parameter values within each shape is dependent on the parameter value α.

FIG. 1A illustrates a subsurface model known as the Marmousi velocity model, in kilometers per second (km/s), over an area that is 3.1-km deep and 17-km wide. In order to segment this model into shapes and interfaces, the objective function (2) is employed. The symbol $\bar{u}$ is defined in equation (2) to be the Marmousi wave speed model and set u(κ)=κ. In addition, the Mumford-Shah functional MS is approximated by the Ambrosio-Tortorelli approximation described in equation (5) and optimize equation (2) using inexact Gauss-Newton.

Figure 1B:
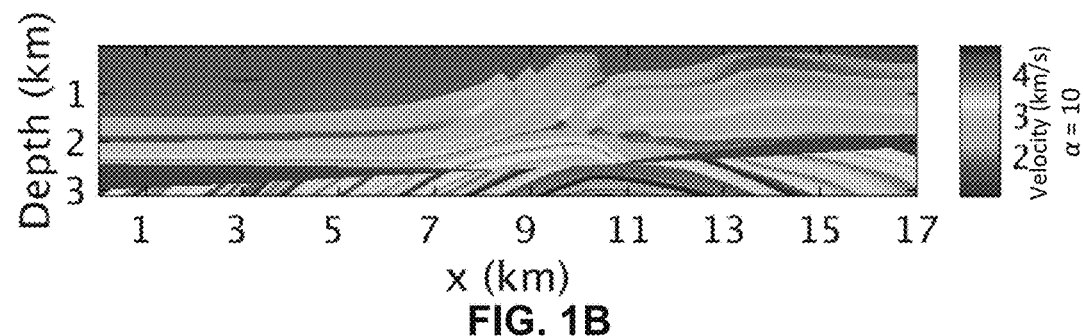
Figure 1C:
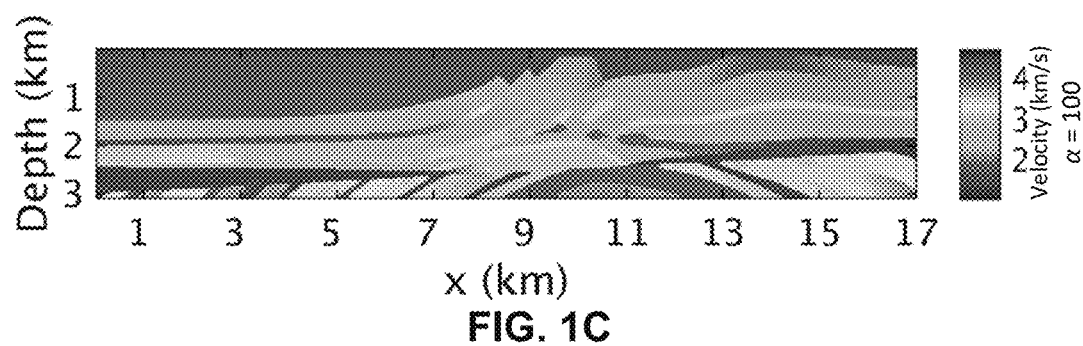
Figure 1D:
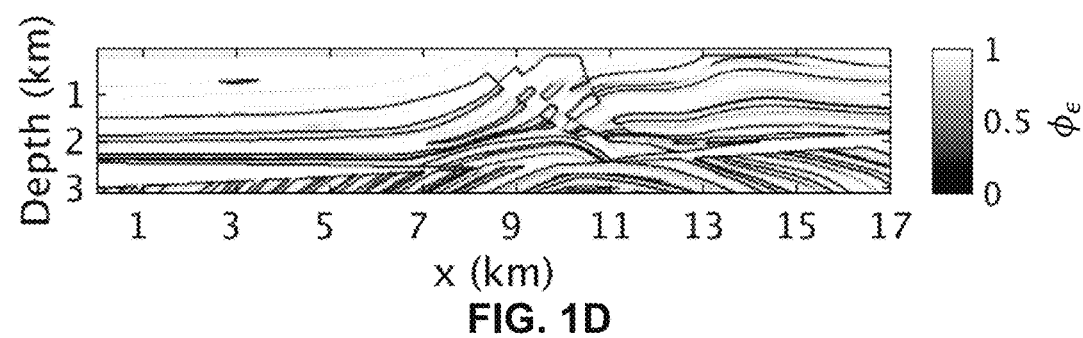

FIGS. 1B and 1C illustrate the parameter values κ resulting from the optimization process using the objective function E of equation (2), the Ambrosio-Tortorelli approximation $MS_\epsilon$ of equation (5), and the regularization function F of equation (4). The results in FIGS. 1B and 1C correspond to the constant α set at 10 and 100, respectively. Compared to the velocity data in FIG. 1B, the velocity data in FIG. 1C is smoother and contains fewer boundaries. FIG. 1D illustrates the resulting interface set $\phi_\epsilon$ when α is set at 10, where the boundaries correspond to the black lines (i.e., $\phi_\epsilon = 0$) and the jumps in the velocity data.

Figure 1E:
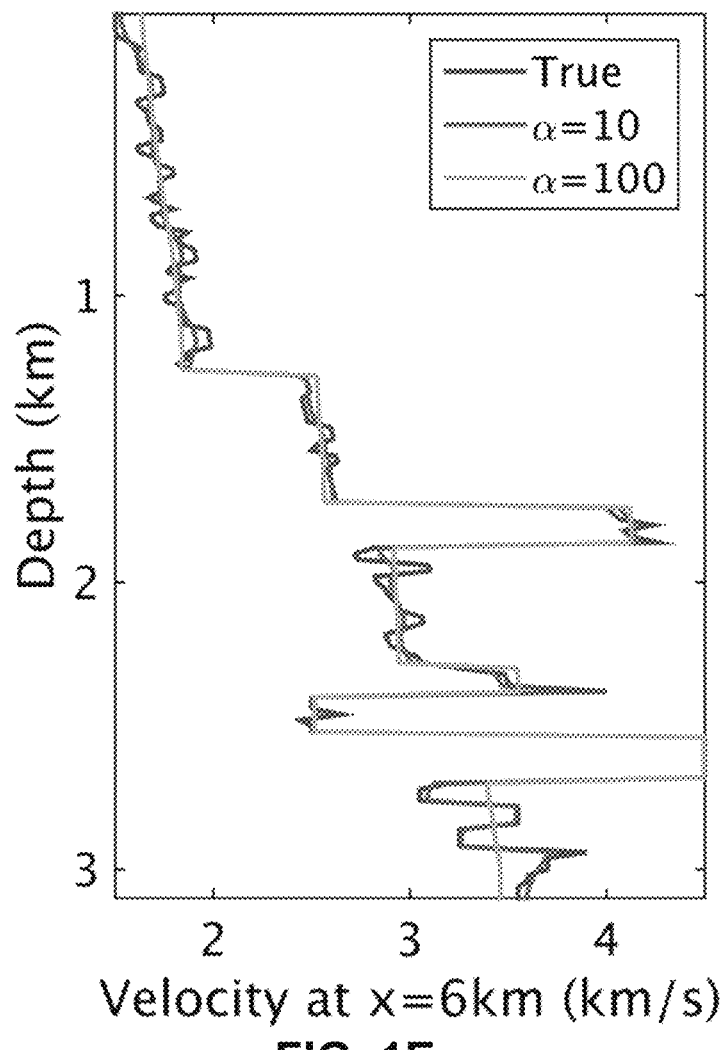
FIG. 1E compares results of an inversion technique to a true model, according to an embodiment of the present disclosure.

FIG. 1E superimposes vertical cross-sections of the velocity plot of FIGS. 1A-1C at the 6-km mark on the x-axis. FIG. 1E confirms that the inverted velocity is smoother when α=100 than when α=10. Typically, setting the constant α at a high value results in smoother inverted parameter values and fewer boundaries. Therefore, if a more detailed image of a subsurface region is desired, the constant α should be kept small.

Next, three numerical examples are studied to compare the Mumford-Shah-based inversion technique to the conventional cell-based inversion technique discussed above. Each of the Mumford-Shah-based inversions consists of the minimization of equation (2) using the Ambrosio-Tortorelli approximation as described in equation (5) and the regularization function F of equation (4). Each of the cell-based inversions consists of the minimization of equation (1). All minimizations are carried out on a regular Cartesian mesh discretization using inexact Gauss-Newton. In the first two examples, ten iterations are used; for the third example, fifty iterations are used. For convenience, all of the examples presented here are two dimensional. However, Mumford-Shah-based inversion may be carried out in any number of spatial dimensions using the procedure described above.

The first two examples consider the inversion of the permeability tensor of a subsurface region from pressure measurements taken throughout the region (i.e., M=Ω). For these examples, all physical quantities, such as pressure and permeability, are assumed to be non-dimensionalized.

Figure 2A:
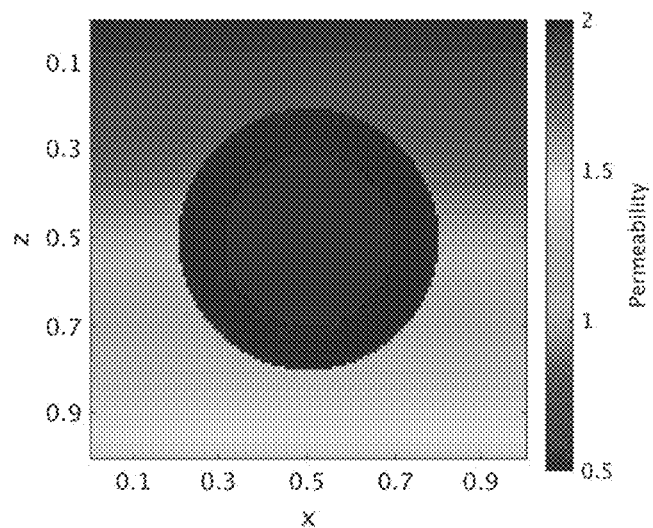
FIGS. 2A and 2B illustrate a first model used to compare inversion techniques, according to an embodiment of the present disclosure.
Figure 2B:
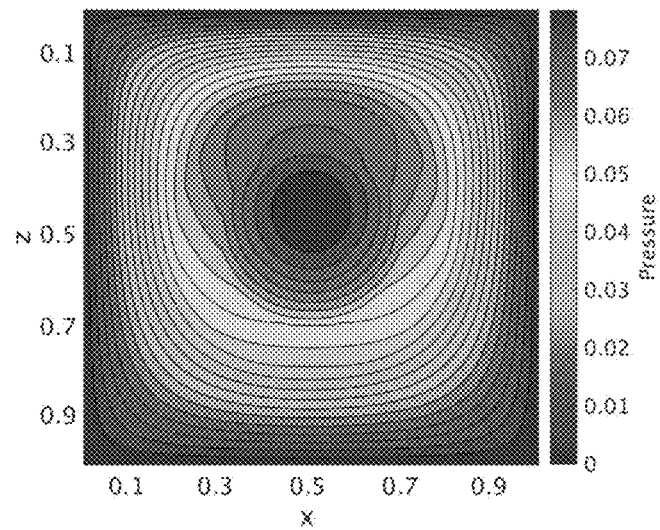

FIGS. 2A and 2B illustrate the first model used to compare the Mumford-Shah-based inversion technique to the conventional cell-based inversion technique, according to an embodiment of the present disclosure. FIG. 2A illustrates a permeability field model used to generate the pressure profile illustrated in FIG. 2B according to equation (6) and a Dirichlet boundary condition for pressure.

$$-\nabla \cdot (\kappa(x) \nabla p(x)) = s(x) \qquad (6)$$

The source term s(x) in equation (6) models fluid injection, while the Dirichlet boundary condition on pressure assumes that pressure values at the boundary of the reservoir are known.

In our first example, the pressure values p(x) in FIG. 2B, computed using equation (6) and the source and boundary terms described above, are used as measurement data (e.g., measured geophysical data $\bar{u}$) to test the conventional cell-based inversion technique and the Mumford-Shah-based inversion technique. It may be assumed that pressure values are available for measurement throughout the subsurface. For simplicity, $p|_{\partial\Omega}=0$ and $s(x)\equiv 1$ are chosen. One skilled in the art would understand that, while this pressure data is synthetic and may be unrealistic, the concept discussed herein for inverting for a permeability tensor would be the same for pressure data obtained from field measurements.

Figure 2C:
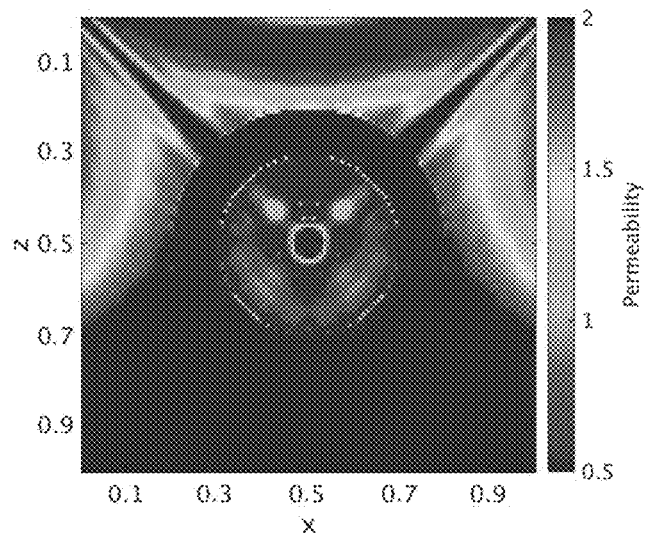
FIGS. 2C and 2D illustrate results from cell-based inversion techniques using the first model, according to an embodiment of the present disclosure.
Figure 2D:
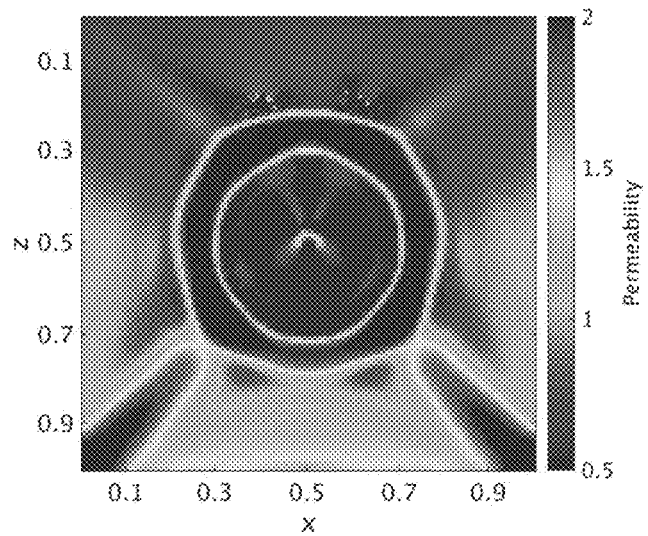
Figure 2E:
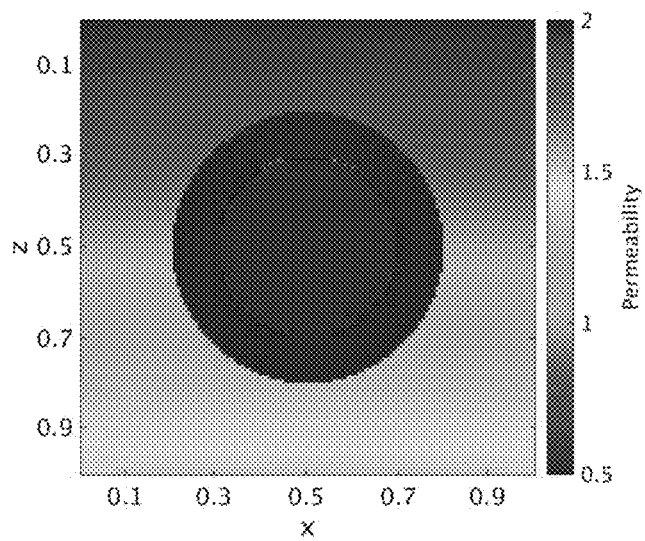
FIGS. 2E and 2F illustrate results from a Mumford-Shah-based inversion technique using the first model, according to an embodiment of the present disclosure.
Figure 2F:
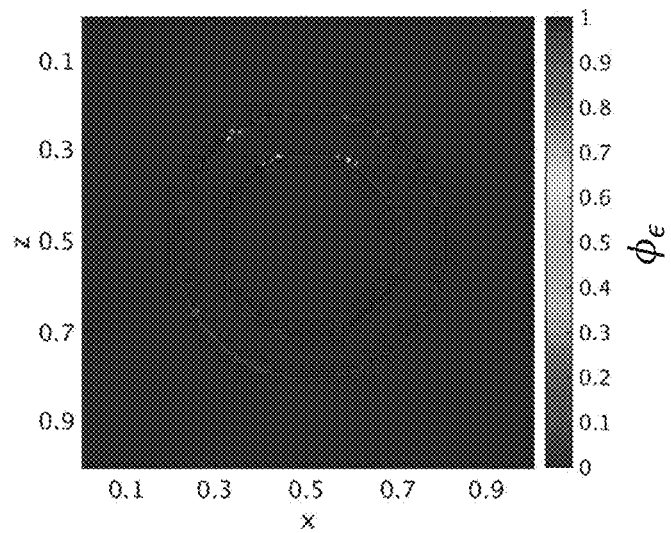

FIGS. 2C and 2D illustrate permeability fields resulting from two conventional cell-based inversion techniques, one without and the other with a regularization term, respectively. The regularization used is first-order Tikhonov, which is known in the art. FIGS. 2E and 2F illustrate the permeability field and the interface set $\phi_\epsilon$, respectively, resulting from the Mumford-Shah-based inversion technique. In these examples, the pressure data of FIG. 2B and an initial guess of $\kappa(x)=4$ are used. While the cell-based inversion technique infers for the permeability tensor $\kappa(x)$ only, the Mumford-Shah-based inversion technique infers for both the permeability tensor $\kappa(x)$ and the interface set $\Gamma$ defined by the zero contour of the interface set $\phi_\epsilon$. The Mumford-Shah-based inversion technique additionally uses $\phi_\epsilon=1$ (i.e., $\Gamma=\emptyset$) as part of its initial guess.

While the cell-based inversion technique without the regularization term recovers some of the large-scale features (i.e., FIG. 2C) of the original model given by FIG. 2A, it also contains high-frequency artifacts and does not properly capture the smooth background permeability field. The addition of Tikhonov regularization stabilizes the cell-based inversion technique; however, the resulting permeability field (i.e., FIG. 2D) smears out the background and the boundaries of the annular region. In contrast, as can be seen in FIG. 2E, the Mumford-Shah-based inversion technique stably recovers the original permeability field of FIG. 2A. Moreover, as shown in FIG. 2F, the Mumford-Shah-based inversion technique correctly identifies the interfaces, which separate shapes in which the permeability is smooth.

Figure 2G:
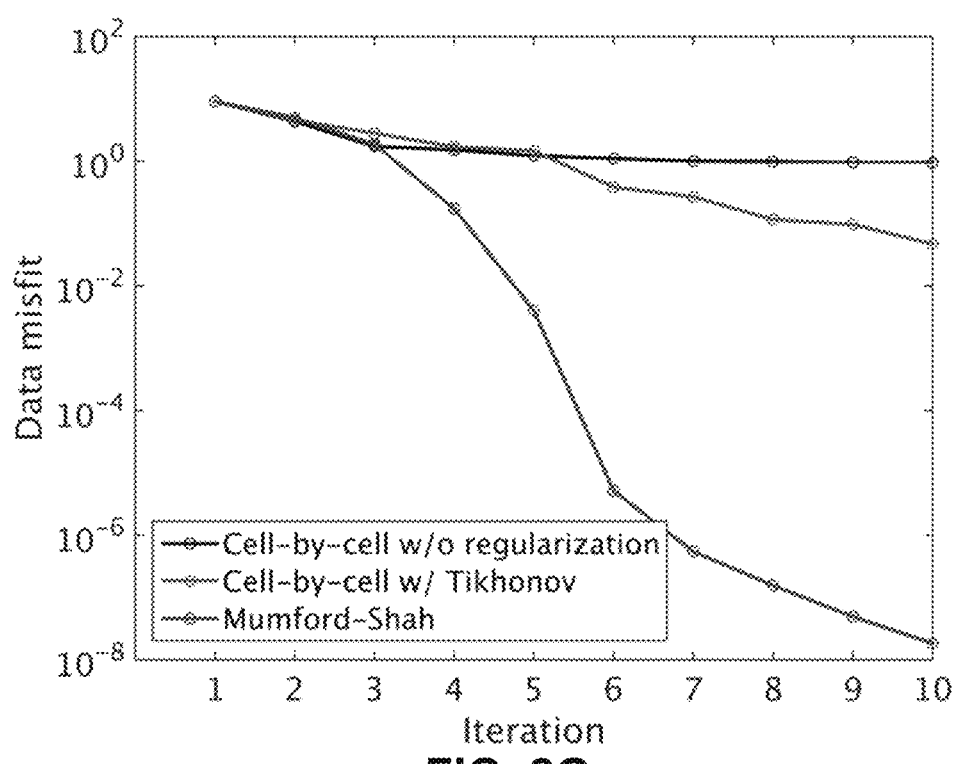
FIG. 2G compares data misfit versus number of iterations for the inversion techniques using the first model, according to an embodiment of the present disclosure.

FIG. 2G compares the data misfit (using a logarithmic scale) versus the number of iterations for the cell-based inversion technique, with and without the Tikhonov regularization, and the Mumford-Shah-based inversion technique. As demonstrated by the magnitude of the data misfit, the Mumford-Shah-based inversion technique quickly converges to the correct model whereas the cell-based inversion techniques, both with and without Tikhonov regularization, decrease at a significantly slower rate.

Figure 2H:
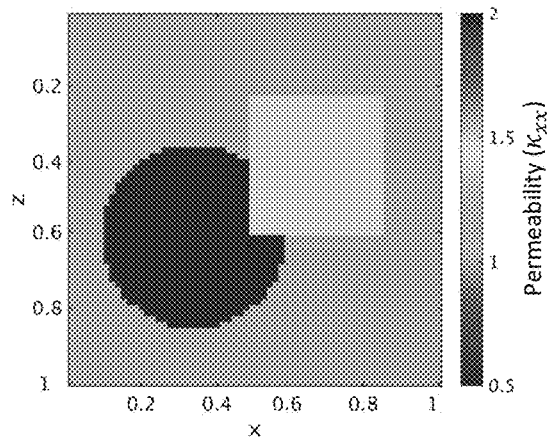
FIGS. 2H-2J illustrate a second model used to compare inversion techniques, according to an embodiment of the present disclosure.
Figure 2I:
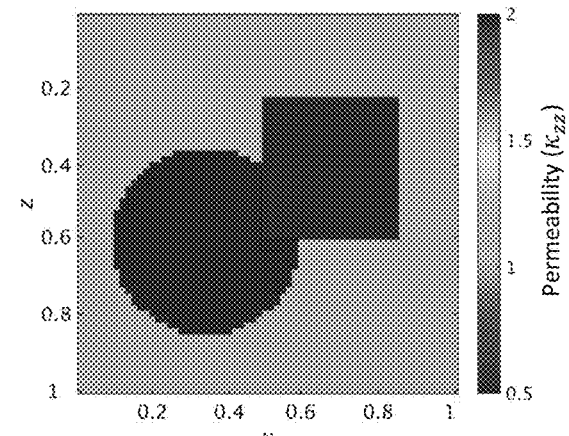
Figure 2J:
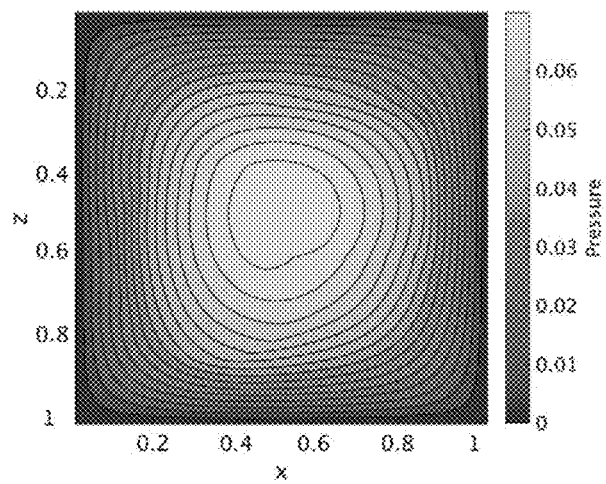

FIGS. 2H-2J illustrate a second model used to compare the Mumford-Shah-based inversion technique to the conventional cell-based inversion technique, according to an embodiment of the present disclosure. Unlike the permeability field model in FIG. 2A, here, the permeability field is modeled to be anisotropic in a [0,1]×[0,1] domain. In particular, the permeability tensor has components $\kappa_{xx}$ in the x-direction and $\kappa_{zz}$ in the z-direction, which are distinct and exhibit different trends, as shown in FIGS. 2H and 2I, respectively. However, these components do share a set of interfaces, where they exhibit sharp contrast.

The measurement data $\bar{u}$ for the second example are given by the pressure profile illustrated in FIG. 2J. These data were computed by solving equation (6) using the zero Dirichlet boundary condition and a source term $s(x)\equiv 1$. Both inversion techniques use the pressure data of FIG. 2J, measured throughout the subsurface, and begin with $\kappa_{xx}=\kappa_{zz}=1$ as initial guess. The Mumford-Shah-based inversion technique additionally uses $\phi_\epsilon=1$ (i.e., $\Gamma=\emptyset$) as initial guess.

Figure 2K:
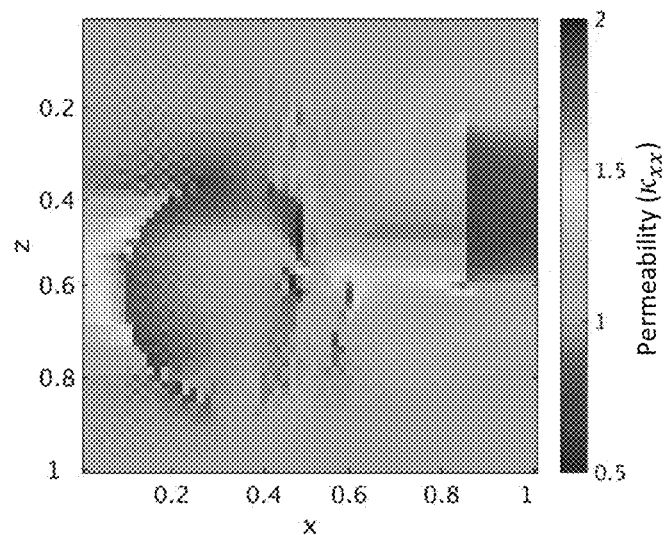
FIGS. 2K and 2L illustrate results from a cell-based inversion technique using the second model, according to an embodiment of the present disclosure.
Figure 2L:
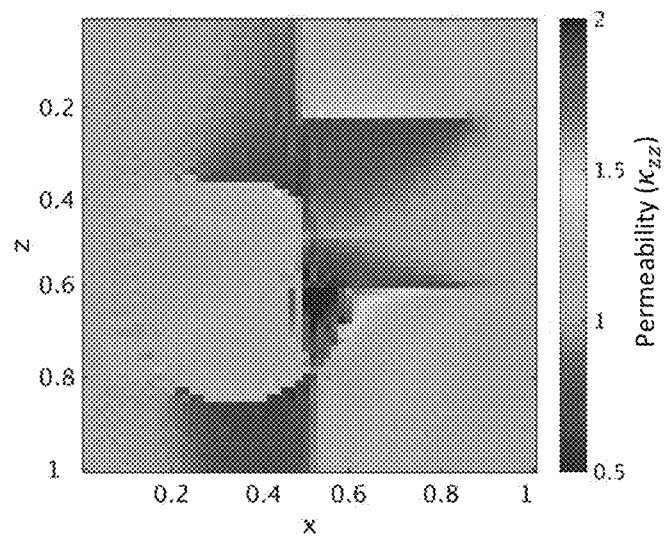
Figure 2M:
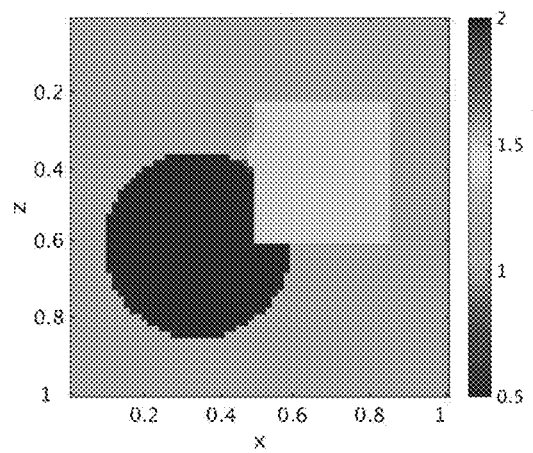
FIGS. 2M-2O illustrate results from a Mumford-Shah-based inversion technique using the second model, according to an embodiment of the present disclosure.
Figure 2N:
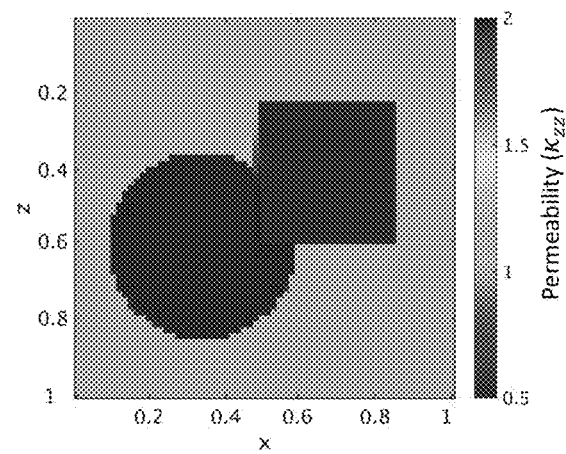
Figure 2O:
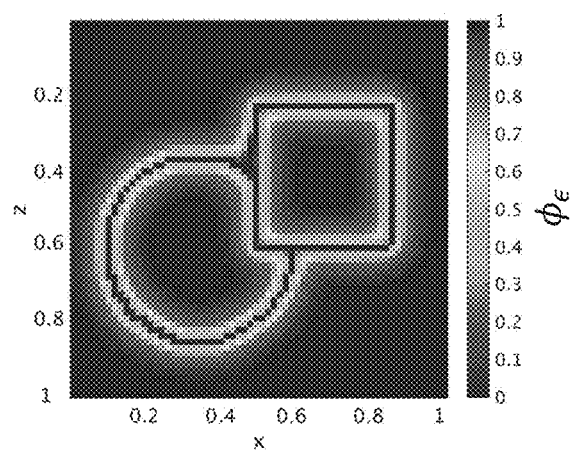

FIGS. 2K and 2L, respectively, illustrate the permeability tensor components $\kappa_{xx}$ and $\kappa_{zz}$ resulting from the conventional cell-based inversion technique without regularization. It is important to note that, in this formulation, there is nothing enforcing structural consistency between the inverted tensor components and, hence, preventing severe non-uniqueness. FIGS. 2M and 2N, respectively, illustrate the permeability tensor components $\kappa_{xx}$ and $\kappa_{zz}$ resulting from the Mumford-Shah-based inversion technique, and FIG. 2O illustrates the interface set $\phi_\epsilon$.

Figure 2P:
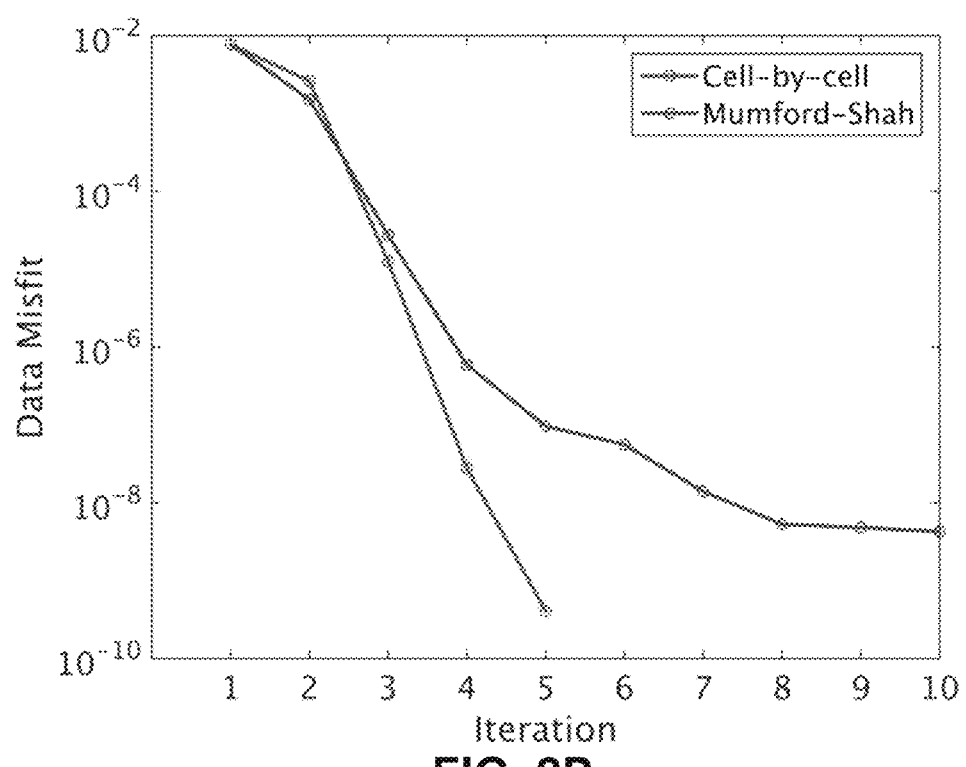
FIG. 2P compares data misfit versus number of iterations for the inversion techniques using the second model, according to an embodiment of the present disclosure.

FIG. 2P compares the data misfit (using a logarithmic scale) versus the number of iterations for the cell-based inversion technique and the Mumford-Shah-based inversion technique. As can be seen, both inversion results match the data well. However, as indicated in FIGS. 2K and 2L, the cell-based inversion technique contains severe artifacts. On the other hand, as can be seen in FIGS. 2M and 2N, the Mumford-Shah-based inversion technique successfully recovers the target image of FIGS. 2H and 2I, and the interfaces at which the permeability tensor components $\kappa_{xx}$ and $\kappa_{zz}$ jump, shown in FIG. 2O.

Figure 3A:
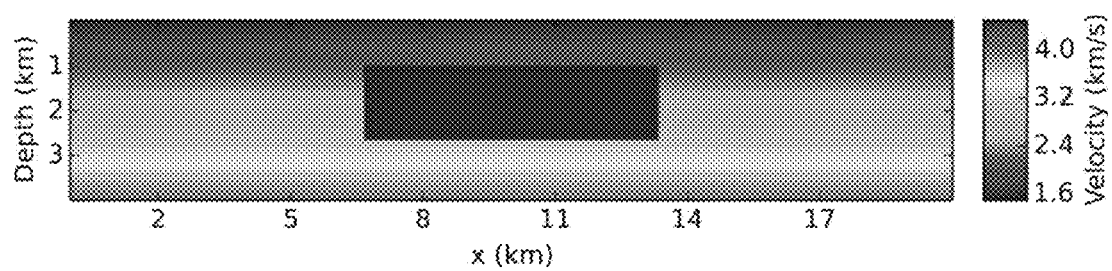
FIGS. 3A-3C illustrate a third model used to compare inversion techniques, according to an embodiment of the present disclosure.

In the third example, the location of an anomalous homogeneous body in a 4-km deep by 20-km wide subsurface is determined by first-arrival travel times measured at seismic receivers located on the top surface of the subsurface. As shown in FIG. 3A, the anomalous body is a rectangular region with constant wave speed of 4.5 km/s. The anomalous body is surrounded by a background having a linearly-varying wave speed, equal to 1.5 km/s at the top surface (depth=0 km) of the subsurface region and increasing to 4.0 km/s at a depth=4 km.

Figure 3B:
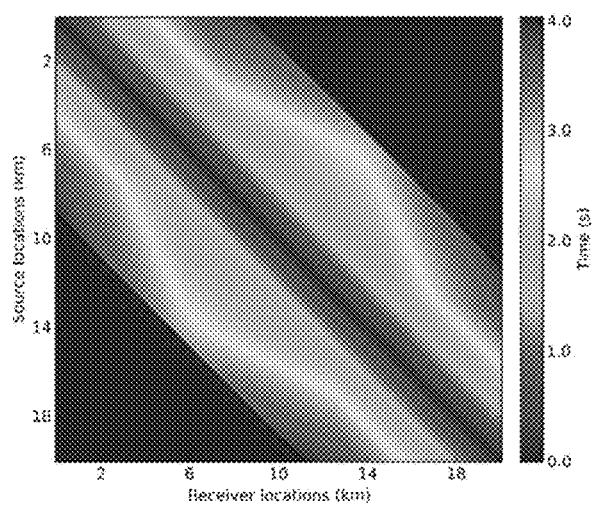
Figure 3C:
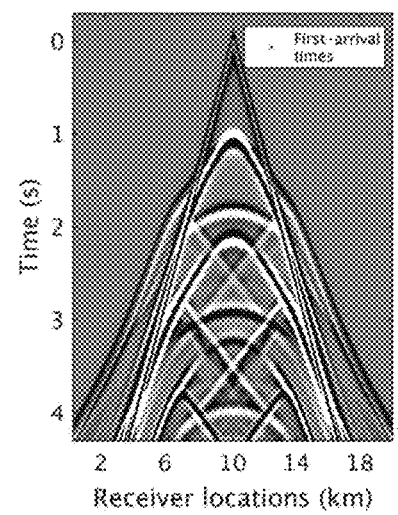

To generate the first-arrival travel times in FIG. 3B, five hundred and one (501) seismic sources and 501 seismic receivers are modeled to be collocated equidistantly on the top surface of the subsurface region from x=0 km to 20 km. In consideration of realistic seismic survey setups, each seismic receiver is limited to only listen to sources within 10 km. In other words, the maximum source-receiver offset is 10 km. Source-receiver offsets longer than 10 km are indicated in FIG. 3B by the dark blue upper and lower triangular regions. An example of a seismogram, due to a source located at x=10 km, is shown in FIG. 3C, where the red line corresponds to the first-arrival times to be used in the inversion.

First-arrival travel times T are computed by solving the Eikonal equation $$|\nabla T| = \frac{1}{\kappa}, \qquad (7)$$

with the boundary condition $T|_{\Gamma_s}=0$ at the source locations $\Gamma_S$ and the spatially varying wave speed $\kappa$ as given. Equation (7) is solved by the fast sweeping method.

The first-arrival times in FIG. 3B, representing measurements by seismic receivers at the top surface of the subsurface, are used as measurement data (i.e., measured geophysical data $\overline{u}$) to test and compare the conventional cell-based inversion technique and the Mumford-Shah-based inversion technique.

Figure 3D:
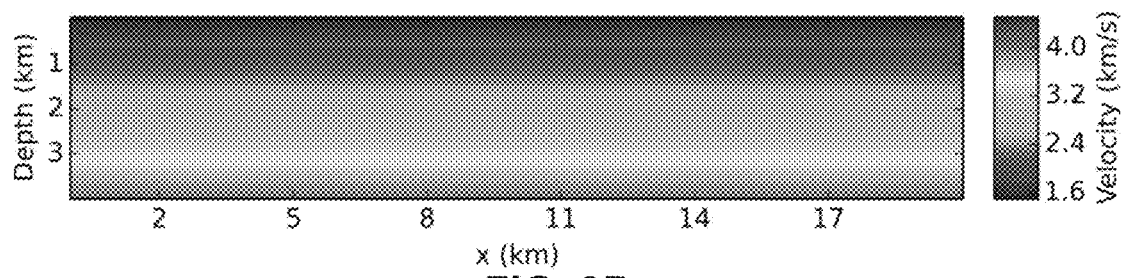
FIGS. 3D and 3E illustrate an initial guess for and a result from a cell-based inversion technique using the third model, according to an embodiment of the present disclosure.
Figure 3E:
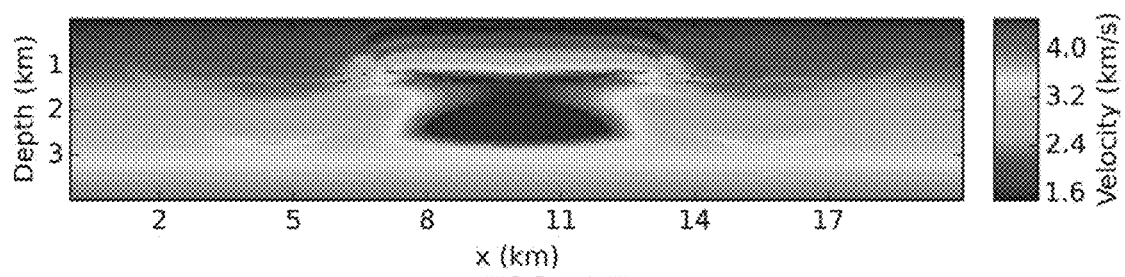

The initial guess for the conventional cell-based inversion technique is the background wave speed profile illustrated in FIG. 3D. No regularization is included in this cell-based inversion. FIG. 3E illustrates the wave speed resulting from the cell-based inversion after fifty iterations of inexact Gauss-Newton.

Figure 3F:
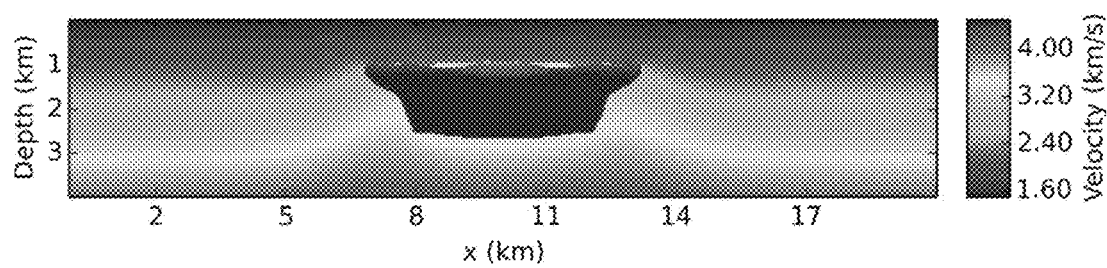
FIGS. 3F and 3G illustrate results from a Mumford-Shah-based inversion technique using the third model, according to an embodiment of the present disclosure.
Figure 3G:
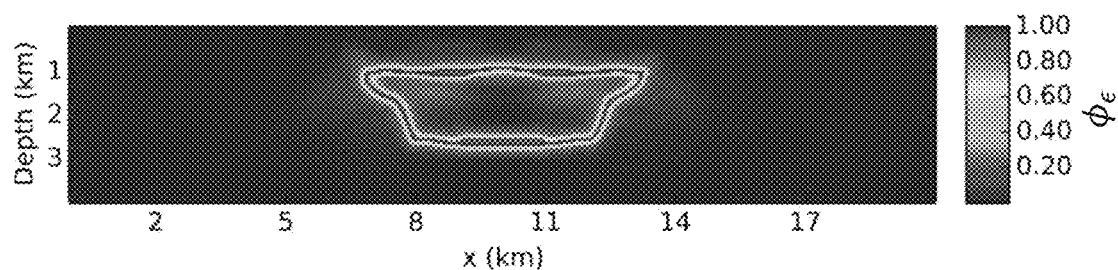

Next, the Mumford-Shah-based inversion technique is applied to invert the first-arrival times in FIG. 3B using the background wave speed profile and $\phi_\epsilon=1$ (i.e., $\Gamma=\emptyset$) as the initial guess. FIG. 3F illustrates the inverted wave speed and FIG. 3G illustrates the inverted interface set $\phi_\epsilon$ resulting from the optimization after fifty iterations. A comparison of FIGS. 3E and 3F indicates that the wave speed recovered by Mumford-Shah-based inversion technique represents an improvement over the cell-based inversion method.

Figure 7A:
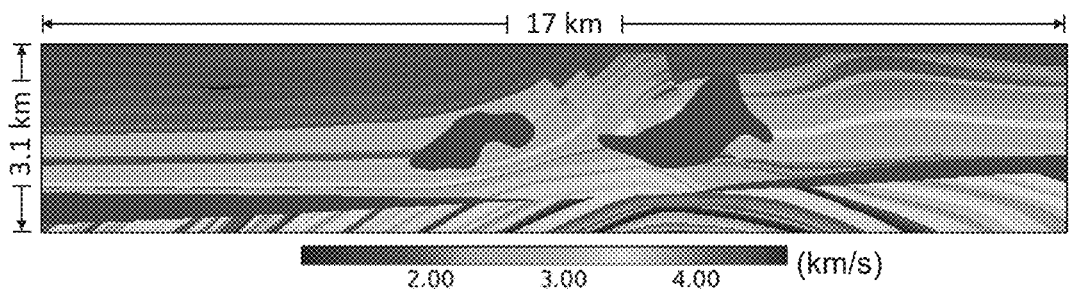
FIG. 7A illustrates a fifth model used to compare inversion techniques, according to an embodiment of the present disclosure.

In each of the three previous examples, the geometry of the subsurface region consisted of a small number of shapes. This fourth example considers the determination of a subsurface region possessing a large number of layers and two anomalous bodies. The available data consists of pressure measurements recorded at seismic receivers located along the surface. As shown in FIG. 7A, the subsurface model is 3.1 km deep by 17 km wide and consists of the Marmousi wave speed model with anomalies overlaid.

To generate the pressure measurements, 100 seismic sources and 500 seismic receivers are modeled to be collocated equidistantly on the top surface of the subsurface region from x=0.25 km to 16.75 km.

Pressure measurements p are computed by solving the acoustic wave equation with the free boundary conditions on the top surface and the absorbing boundary conditions along the other boundaries.

$$\frac{1}{\kappa}\frac{\partial^2 p}{\partial t^2} = \nabla \cdot \left(\frac{1}{\rho}\nabla p\right) - \nabla \cdot \frac{f}{\rho},$$

$$p = \frac{\partial p}{\partial t} = 0 \text{ at } t = 0,$$

$$p = 0 \text{ on } \Gamma_{free} \times [0, T],$$

$$\sqrt{\frac{\rho}{\kappa}}\frac{\partial p}{\partial t} + n \cdot \nabla p = 0 \text{ on } \Gamma_{absorbing} \times [0, T].$$

The density $\rho$ is set equal to 1 g/cm$^3$. The source f corresponds to a 2 Hz low-cut Ricker wavelet with a 5 Hz peak frequency.

Figure 7B:
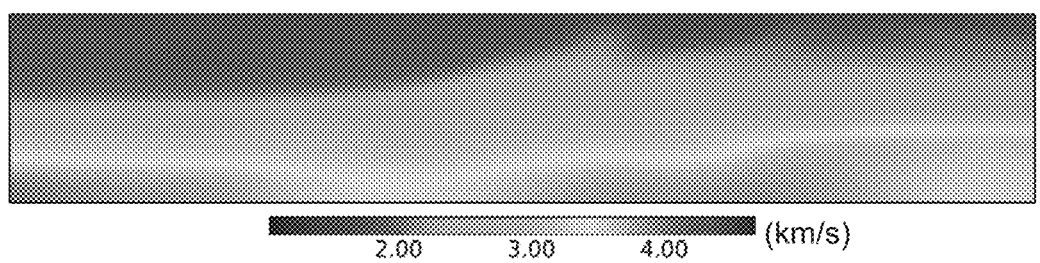
FIGS. 7B and 7C illustrate an initial guess for a Mumford-Shah-based inversion technique using the fifth model, according to an embodiment of the present disclosure.
Figure 7C:
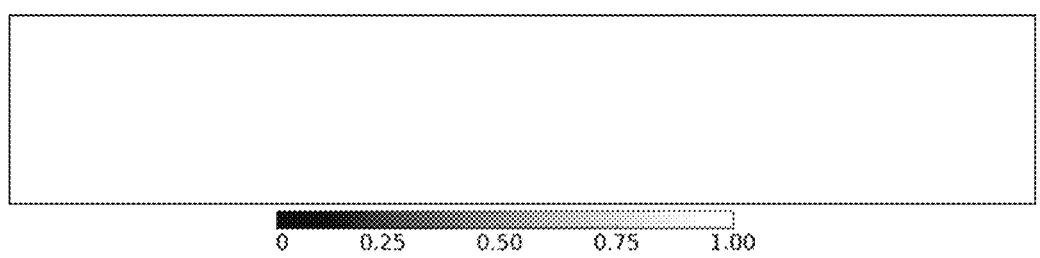

The initial guess for the Mumford-Shah inversion technique is the wave speed profile illustrated in FIG. 7B and the boundary set illustrated in FIG. 7C. The initial guess for the wave speed captures some of the large-scale trends of the Marmousi model but does not incorporate any information regarding the anomalies. The initial guess for the boundary set corresponds to $\phi_\epsilon=1$ (i.e. $\Gamma=\emptyset$).

Figure 7D:
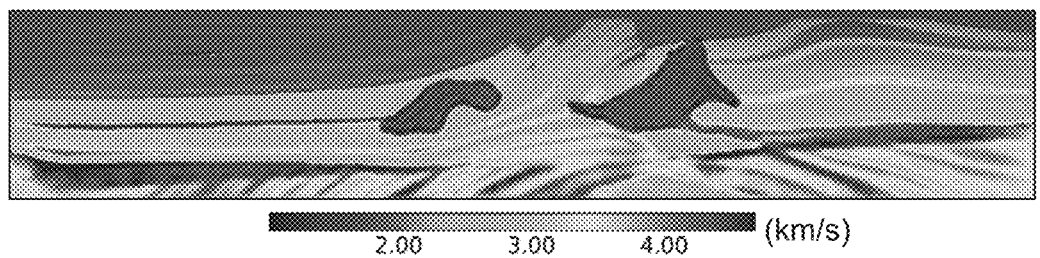
FIGS. 7D and 7E illustrate results from a Mumford-Shah-based inversion technique using the fifth model, according to an embodiment of the present disclosure.
Figure 7E:
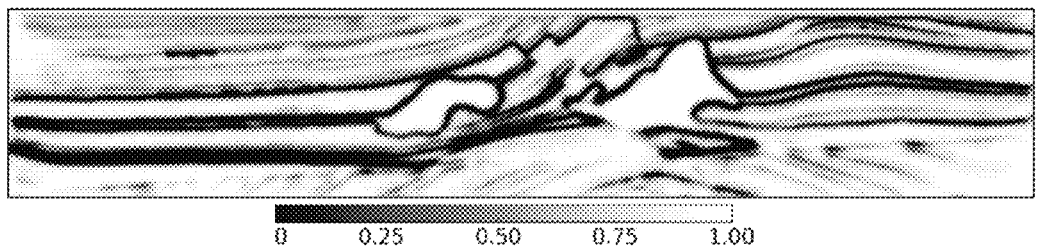

FIGS. 7D and 7E illustrate the inverted wave speed $\kappa(x)$ and the inverted interface set $\phi_\epsilon$. The inverted wave speed demonstrates the ability of Mumford-Shah to determine a large number of interfaces and shapes from acoustic pressure measurements.

The determination of the wave speed and the boundary set shown in FIGS. 7D and 7E required a multi-stage approach to Mumford-Shah inversion. In the first stage, equation (5) was minimized using the value $\beta=10^{-7}$. In the second stage, the value of $\beta$ was decreased to $\beta=10^{-8}$. In the third stage, the value of $\beta$ was decreased to $\beta=10^{-9}$.

Figure 7F:
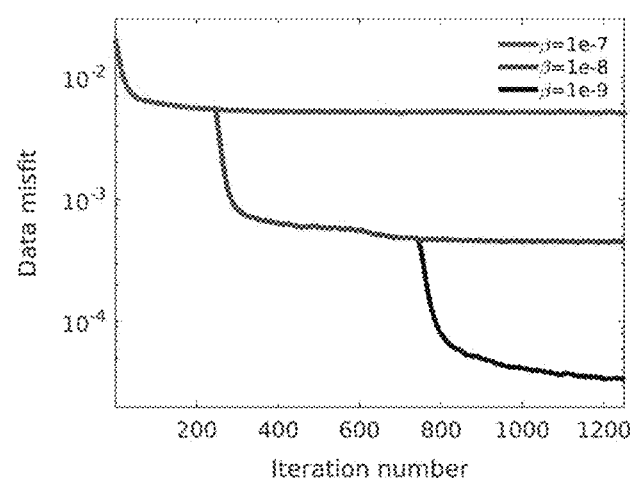
FIGS. 7F and 7G compare data misfit and model misfit versus number of iterations, along with their dependence on the parameter (3, for a Mumford-Shah-based inversion technique using the fifth model, according to an embodiment of the present disclosure.
Figure 7G:
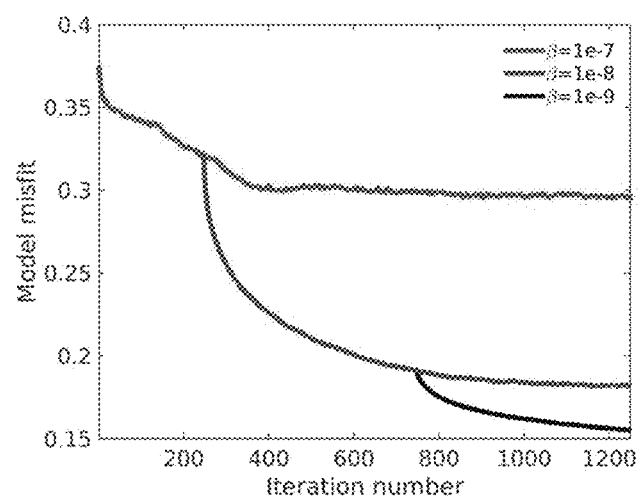

FIGS. 7F and 7G compare the data misfit and model misfit versus the number of iterations for the Mumford-Shah inversion technique. The branch points displayed in FIGS. 7F and 7G indicate iterations where the value of $\beta$ was decreased. As these figures indicate, keeping $\beta$ fixed leads to a plateau in data and model misfit while a decrease in $\beta$ results in a decrease in both data and model misfit.

The Mumford-Shah-based inversion technique has two strengths. First, Mumford-Shah inversion is capable of partitioning a subsurface region into an arbitrary number of shapes and interfaces. Second, Mumford-Shah inversion permits a wide range of spatial variation of the geophysical parameters $\kappa$ within each shape (e.g. not obeying an analytic trend). Hence, for problems containing an unknown number of shapes or shapes within which parameter values vary significantly, Mumford-Shah-based inversion may prove to be beneficial. However, for problems in which the number of shapes and the expected trend of the parameters $\kappa$ (e.g. piecewise constant or linear) are known in advance, an alternative inversion method known as the phase-field inversion technique may be advantageous. In contrast with the Mumford-Shah-based inversion technique, the phase-field inversion technique prescribes at the outset the maximum number of shapes to be inverted as well as information regarding the trend of the parameters $\kappa$ within each shapes (e.g., restricting the parameters $\kappa$ to be constant in each).

The phase-field inversion technique decomposes a spatial domain $\Omega$ representing the subsurface region of interest into disjoint shapes $\Omega_i$. The shapes $\Omega_i$, along with corresponding parameter values $\kappa_i$, are unknowns that may be determined by optimizing an objective function H. The objective function H is $$H(\kappa_1, \ldots, \kappa_n, \Omega_1, \ldots, \Omega_n) = \int_M \|u(\kappa) - \overline{u}\|^2 dx + \beta \sum_{i=1}^n \int_{\partial\Omega_i \cap \Omega} \|t(s)\|_{\partial\Omega} ds, \quad (8)$$

where $\overline{u}$ is the measured geophysical data from at least one data set and $u(\kappa)$ is data computed from a forward model (e.g. elastic wave propagation, gravitational attraction, electrical wave propagation, flow in porous media) during the optimization of the objective function H. The operator $\|\cdot\|$ is an arbitrary norm used to quantify the error or misfit between the computed data $u(\kappa)$ and the measured geophysical data $\overline{u}$ M is a domain describing spatial locations of the measured geophysical data $\overline{u}$ In addition, t(s) represents a tangent vector at the interface all and $\|\cdot\|_{\partial\Omega}$ is an arbitrary norm measuring an arclength s, which may be either isotropic or anisotropic. A spatially-varying parameter field may be defined by $\kappa(x)=\kappa_i(x)$ for $x \in \Omega_i$. The minimization of the phase field objective function H, described by equation (8), can be performed in any number of spatial dimensions. It should be noted that providing geophysical data $\overline{u}$ to equation (8) is an example of providing at least one geophysical data set containing data measured from the subsurface region to an objective function.

The objective function H includes two terms—a data misfit term $\int_M \|u(\kappa)-\overline{u}\|^2 dx$ and an interface penalization term $\beta \sum_{i=1}^n \int_{\partial\Omega_i \cap \Omega} \|t(s)\|_{\partial\Omega} ds$. The data misfit term $\int_M \|u(\kappa)-\overline{u}\|^2 dx$ ensures that the inferred parameter values $\kappa_i$ are consistent with the measured geophysical data $\overline{u}$ The interface penalization term $\beta \sum_{i=1}^n \int_{\partial\Omega_i \cap \Omega} \|t(s)\|_{\partial\Omega} ds$ ensures that the interfaces of the shapes $\Omega_i$ do not exhibit unphysical oscillations. The constant $\beta$ controls the complexity of the shapes $\Omega_i$.

There are two methods that are commonly used to optimize the objective function H—the phase-field approximation and the level-set method. Hereinafter, the phase-field approximation is applied to the optimization of the objective function H. When the number of shapes to be determined in equation (8) is restricted to two (i.e., $\Omega_2 = \Omega/\Omega_1$), the Euclidean norm is used to measure arclength, and the subsurface model is piecewise constant, the phase-field method amounts to the determination of a phase-field function $\phi_\epsilon : \Omega \rightarrow \mathbb{R}$ and parameter values $\{\kappa_{\epsilon,1}, \kappa_{\epsilon,2}\}$ minimizing the objective function $$H_\epsilon(\kappa_1, \kappa_2, \phi) = \int_M \|u(\kappa) - \bar{u}\|^2 dx + \frac{\beta}{2}\left(\epsilon \int_\Omega |\nabla \phi|^2 dx + \int_\Omega \frac{1}{\epsilon}(\phi^2 - 1)^2 dx\right) \quad (9)$$

for $\epsilon \ll 1$. In this example, the parameter field $\kappa(x)$ is determined by a relationship with the phase-field function $\phi$ given by $$\kappa(\phi, x) = \frac{1 + \phi(x)}{2} \kappa_1 + \frac{1 + \phi(x)}{2} \kappa_2. \quad (10)$$

It can be shown that, due to $\epsilon \ll 1$, $H_\epsilon$ represents an approximation of H. This result is valid in any number of spatial dimensions (e.g. n=2 or 3). In particular, the second and third integrals in equation (9) lead to $$\phi_\epsilon \approx \tanh\left(\frac{d(x, \partial\Omega_1 \cap \Omega)}{\epsilon}\right),$$

where $d(x, \partial\Omega_1 \cap \Omega)$ is the signed distance to the interface all $\partial\Omega_i \cap \Omega$ in equation (8). This relationship enables the determination of the shapes $\{\Omega_1, \Omega_2\}$ from the phase-field function $\phi_\epsilon$ and motivates the definition of $\kappa(x)$ in terms of the phase-field function $\phi$ found in equation (10). This framework may be generalized to the case where the subsurface model is not piecewise constant by choosing another relationship between parameter field $\kappa(x)$ and the phase-field function $\phi$.

In order to perform phase-field inversion and minimize equation (8), using the phase-field approximation given by equation (9), the function $\phi$ and the integration and differentiation operators in equation (9) on a grid must first be discretized. The mesh size h of this grid must be much smaller than $\epsilon$ (i.e. h<<$\epsilon$), in order to numerically resolve the boundary layer of $\phi_\epsilon$ near interfaces. Given such a cell-based discretization of $\phi$, optimization may be performed for the cell values of $\phi$ and the parameter values $\kappa(x)$ corresponding to each shape using a gradient-based optimization method such as Gauss-Newton, quasi-Newton, or steepest descent. Finally, the location of the shapes from the cell values of $\phi_\epsilon$ may be recovered.

The phase-field inversion technique is compared to the conventional cell-based inversion technique using three examples. In these examples, the location of an anomalous homogeneous body in a 4-km deep by 20-km wide subsurface is determined by first-arrival travel times, then separately using gravity data, and finally using both data sets (i.e., first-arrival times and gravity data). As shown in FIGS. 3A and 5, the anomalous body is a rectangular region with wave speed and density, respectively, different from the background.

Each phase-field inversion is performed by optimizing equation (9) using the representation of $\kappa$ given by equation (10). Each cell-by-cell inversion is carried out by optimizing equation (1). Each optimization is performed on a regular Cartesian mesh discretization using fifty iterations of inexact Gauss-Newton. For convenience, all of the examples presented here are two dimensional. However, phase-field inversion may be carried out in any number of spatial dimensions using the procedure discussed above.

In the first example, the location of the anomalous body is inverted using the first-arrival travel times measured by seismic receivers at the top of the subsurface as described above with respect to FIGS. 3A-3C. FIG. 3A illustrates the wave speed model used to generate, using seismic simulations, the first-arrival travel-times illustrated in FIGS. 3B and 3C. The first-arrival times in FIG. 3B are used as measurement data (i.e., measured geophysical data $\bar{u}$) to test and compare the conventional cell-based inversion technique and the phase-field inversion technique.

As described above, the initial guess for the conventional cell-based inversion technique is the background wave speed profile illustrated in FIG. 3D. No regularization is included in this cell-based inversion. FIG. 3E illustrates the wave speed resulting from the cell-based inversion after fifty iterations of inexact Gauss-Newton.

Next, the phase-field inversion technique is applied to invert the first-arrival times in FIG. 3B using the background wave speed profile as the initial guess. Although in theory the phase-field inversion technique can infer for both parameter values $\kappa_i$ (i.e., wave speed values in this example) and shapes $\Omega_i$, the results presented here keep the parameters values $\kappa_i$ fixed during the optimization process and only infer for the phase-field function $\phi$ which partitions the subsurface into two shapes $\{\Omega_1, \Omega_2\}$. The shape $\Omega_1$ represents the anomalous body and the shape $\Omega_2$ represents the surrounding background. The parameter value $\kappa_1$, the wave speed within the anomalous body, is fixed at 4.5 km/s and is assumed to be known. The parameter value $\kappa_2$ is fixed to be the background wave speed profile, shown in FIG. 3D, and is also assumed to be known. The initial guess for the minimization of equation (9) is $\phi = -1$.

Figure 4A:
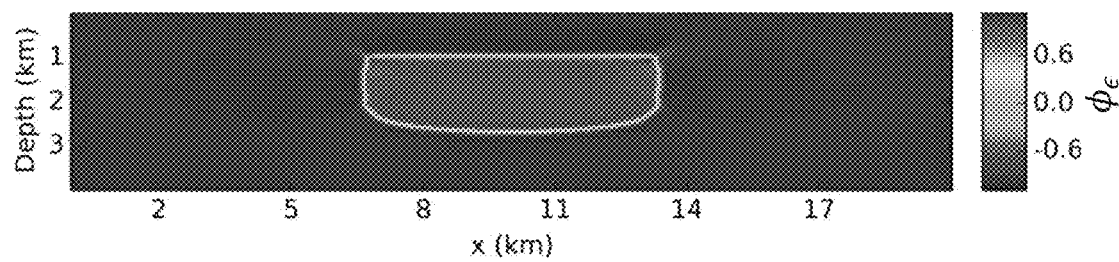
FIGS. 4A and 4B illustrate results from a phase-field inversion technique using the third model, according to an embodiment of the present disclosure.
Figure 4B:
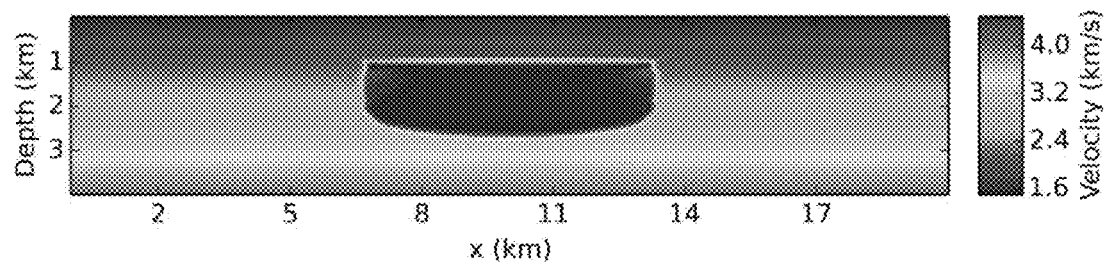

The phase-field function $\phi_\epsilon$ resulting from the optimization after fifty iterations is shown in FIG. 4A. As can be seen in FIG. 4A, the phase-field function $\phi_\epsilon$ demarks two shapes with a narrow transition in-between where $\phi_\epsilon$ goes from a value of 1 in the inner region to a value of $-1$ in the outer region. The corresponding wave speed profile, shown in FIG. 4B, can then be obtained by plugging the phase-field function $\phi_\epsilon$ of FIG. 4A into equation (10).

Figure 5A:
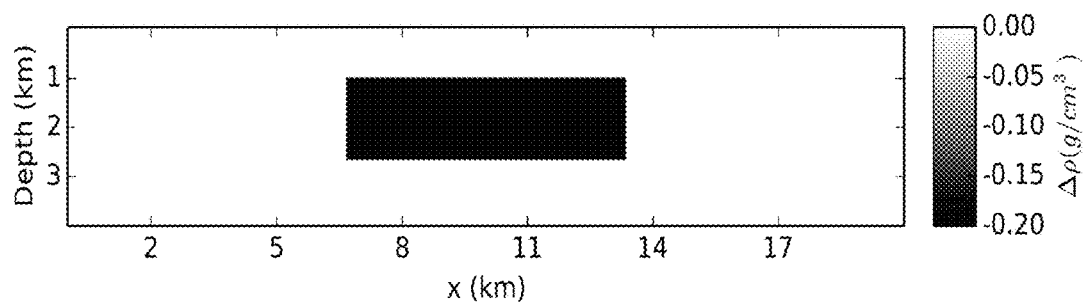
FIGS. 5A and 5B illustrate a fourth model used to compare inversion techniques, according to an embodiment of the present disclosure.
Figure 5B:
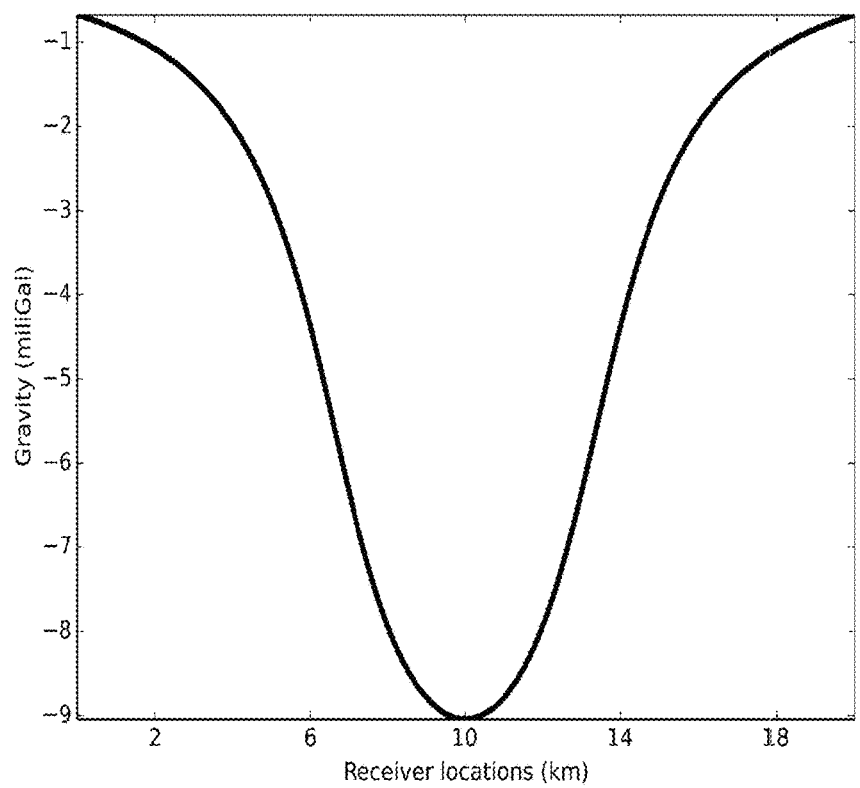

In the next example, the location of the same anomalous body is inverted for using gravity anomaly data alone. FIG. 5A illustrates the true density anomaly model. FIG. 5B illustrates the gravity anomaly data available to the inversion. This data is based on 501 measurement locations along the surface at 300 m above the top surface. Gravity anomaly data $g_z$ is generated by solving for the gravitational potential in equation (11) and using the relationship $g_z = \partial U / \partial z$.

$$\nabla^2 U = 4\pi G \Delta \rho, \quad (11)$$

where $\nabla^2$ is the Laplacian operator, G is the gravitational constant of $6.67408 \times 10^{-11}$ m$^3$kg$^{-1}$s$^{-2}$, and $\Delta \rho$ indicates the spatially varying difference between the subsurface density and the background density defined by equation (12).

$$\Delta\rho(x) = \begin{cases} \Delta\rho_a & \text{if } x \in \text{anomaly} \\ 0 & \text{if } x \notin \text{anomaly} \end{cases} \quad (12)$$

Similar to the previous example, the phase-field inversion assumes as known the density anomaly value $\Delta\rho_a$ corresponding to the density increment due to the anomaly in $\Omega_1$; the remaining unknown is the phase-field function $\phi$ determining the shapes $\Omega_1$ and $\Omega_2$. Then, the density anomaly can be solved using equation (13).

$$\Delta\rho(x) = \frac{1-\phi(x)}{2}\Delta\rho_a \quad (13)$$

Figure 5C:
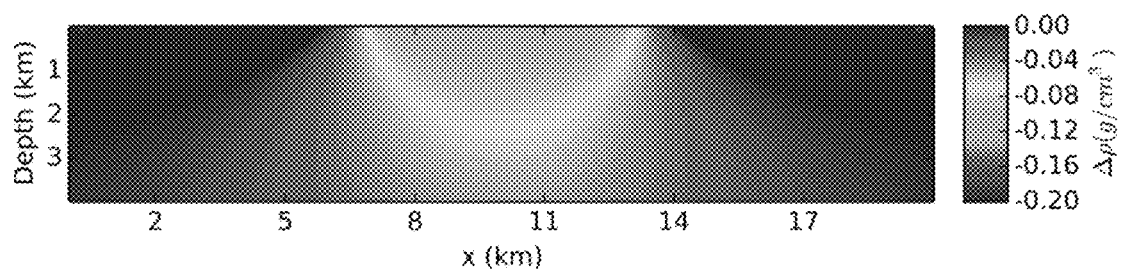
FIG. 5C illustrates a result from a cell-based inversion technique using the fourth model, according to an embodiment of the present disclosure.
Figure 5D:
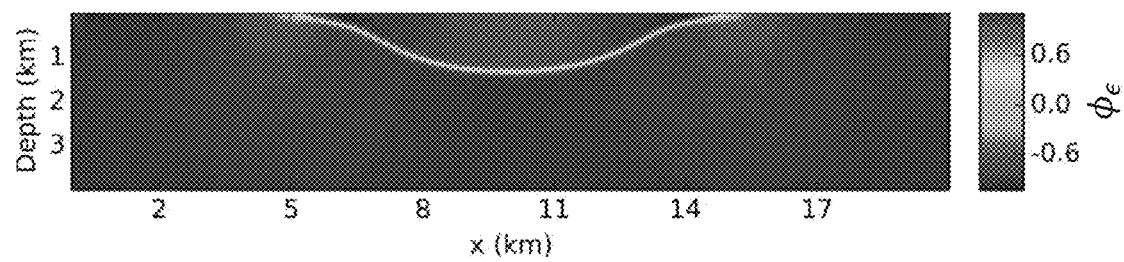
FIGS. 5D and 5E illustrate results from a phase-field inversion technique using the fourth model, according to an embodiment of the present disclosure.
Figure 5E:
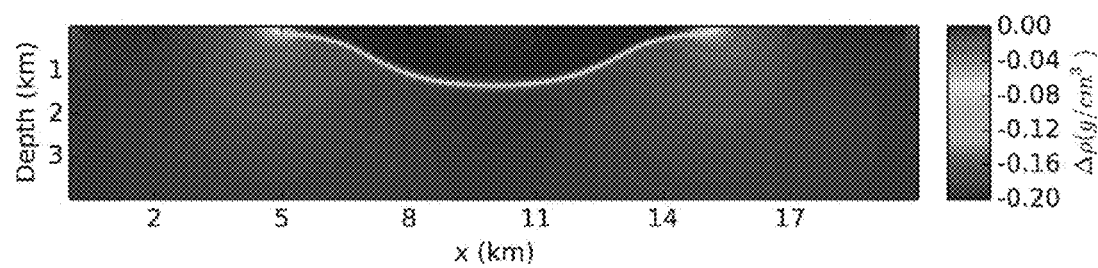

The zero density anomaly model is used as an initial guess for both the conventional cell-based and phase-field inversion techniques. No regularization term is included in the cell-based inversion technique. FIG. 5C illustrates the density anomaly resulting from the cell-based inversion after fifty iterations, and FIGS. 5D and 5 illustrate the phase-field function $\phi_\epsilon$ and density anomaly, respectively, resulting from phase-field inversion. In this circumstance, neither the conventional cell-based inversion technique nor the phase-field inversion technique accurately locates the anomalous body.

In the third example, the location of the anomalous body is inverted for using both the first-arrival travel time data found in FIG. 3B and the gravity data anomaly data illustrated in FIG. 5B. The initial guesses for wave speed and density remain unchanged from the earlier examples.

Figure 6A:
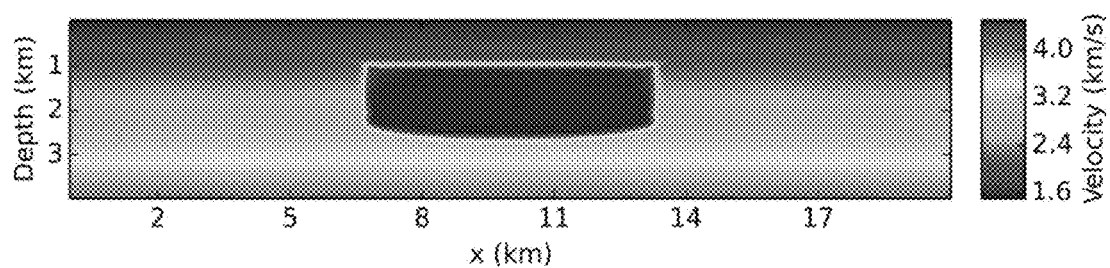
FIGS. 6A-6C illustrate results from a phase-field inversion technique using data from the third and fourth models, according to an embodiment of the present disclosure.
Figure 6B:
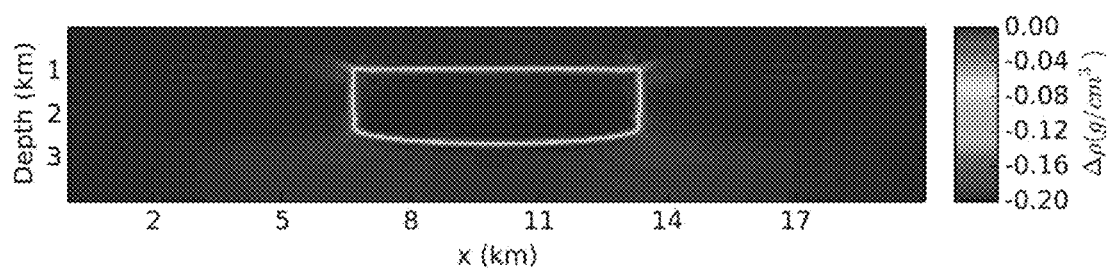
Figure 6C:
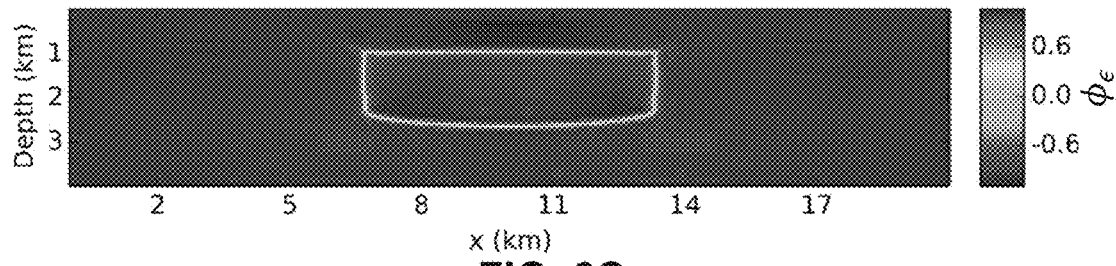

Because the cell-based approach does not couple density and wave speed, the resulting density and wave speed profiles are identical to those obtained in the previous two examples. Namely, for the cell-based inversion technique, FIG. 3E represents the inverted wave speed profile and FIG. 5C represents the inverted density profile. The inverted wave speed and density profiles determined by the phase-field inversion, along with the phase-field function $\phi_\epsilon$, are displayed in FIGS. 6A, 6B, and 6C respectively. This result indicates that the joint inversion of first-arrival travel time data and gravity data greatly improves the estimation of density and provides some uplift to wave speed.

Figure 6D:
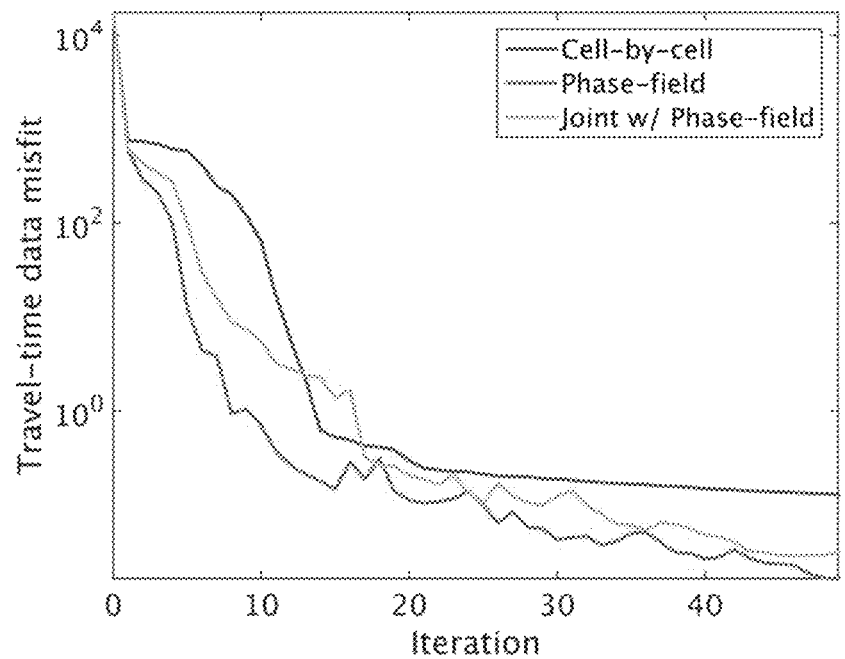
FIGS. 6D and 6E compare travel-time data misfit and wave speed model misfit for the cell-based and phase-field inversion techniques versus number of iterations, according to an embodiment of the present disclosure.
Figure 6E:
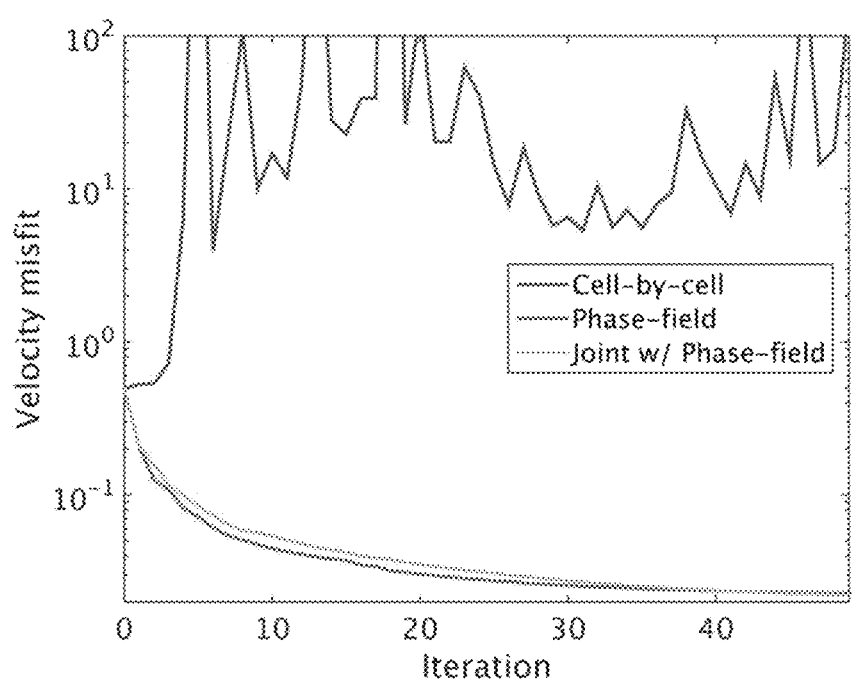

FIGS. 6D and 6E respectively compare first-arrival travel time data misfit and wave speed model misfit versus the number of iterations for the three inversion approaches considered above: cell-based, phase-field using only travel time data, and phase-field using both travel time and gravity data. As can be seen in FIG. 6D, the data misfit decreases monotonically for the cell-based inversion but does not for the phase-field ones. This is due to the fact that the phase-field objective function contains geometric regularization terms in addition to the data misfit. As a result, the overall objective in the phase-field inversions decreases monotonically but the data misfit is not guaranteed to do so. In FIG. 6E, the model misfit—computed as the norm of the difference between the inverted model and the true model, divided by the number of cells—shows that the inverted model based on the phase-field inversion technique is closer to the true model than the result determined by cell-based inversion. This superior convergence can be visually observed by comparing the wave speed profiles in FIGS. 3E, 4B, and 6A to the true wave speed profile in FIG. 3A.

Figure 6F:
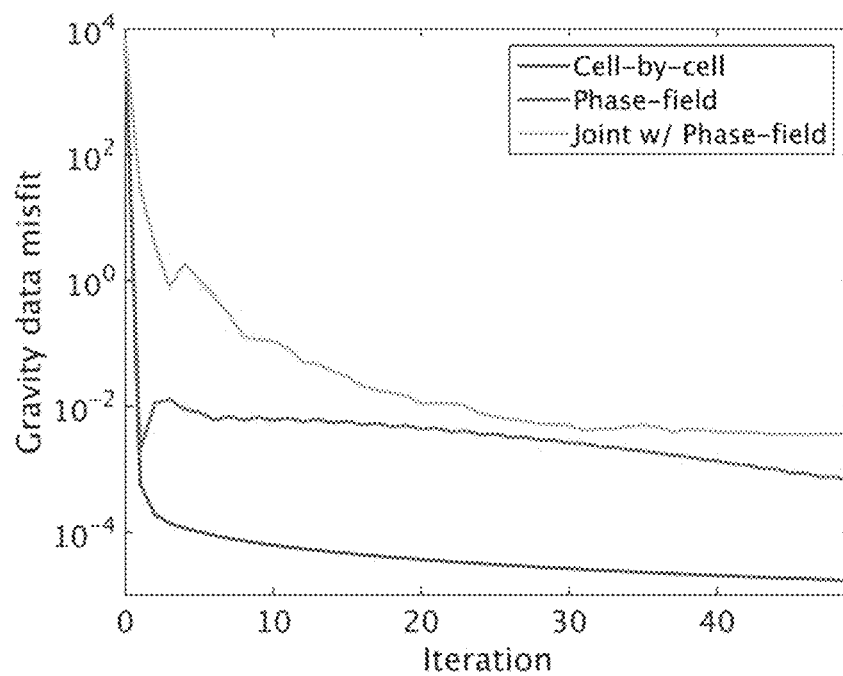
FIGS. 6F and 6G compare gravity data misfit and density anomaly model misfit for the cell-based and phase-field inversion techniques versus number of iterations, according to an embodiment of the present disclosure.
Figure 6G:
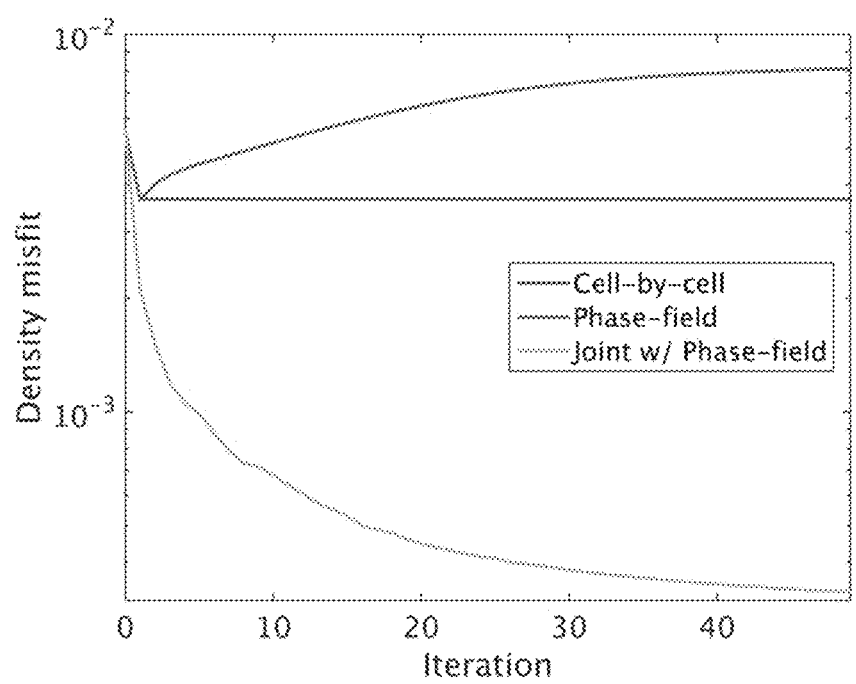

FIGS. 6F and 6G respectively compare gravity data misfit and density model misfit versus the number of iterations for the three inversion approaches considered above: cell-based, phase-field using only gravity data, and phase-field using both travel time and gravity data. In FIG. 6G, the model misfit shows that the inverted model based on the phase-field inversion technique using gravity and travel-time data is closer to the true model than either the cell-based or phase-field results determined using only gravity data. This superior convergence can be visually observed by comparing the density in FIGS. 5C, 5E, and 6B to the true density anomaly in FIG. 5A.

The fourth example investigates the impact of a shape-based constraint on the identification of two anomalous homogeneous bodies from acoustic pressure measurements. The setup is identical to the fourth example of the Mumford-Shah inversion technique. The phase-field inversion technique, under the additional constraint that the total volume of the two anomalies is known, is compared to the unconstrained phase-field inversion technique. In practice, an estimate of the anomalies' volume may be obtained using gravity data.

The unconstrained and constrained phase-field inversions are performed by optimizing equation (9). For both inversions, the parameter values $\kappa_i$ in equation (10) are held fixed and assumed to be known. The parameter value $\kappa_1$, the wave speed within the anomalous body, is fixed at 4.5 km/s and the spatially varying parameter value $\kappa_2$ is given by the background wave speed profile shown in FIG. 8A. Each optimization is performed on a regular Cartesian mesh discretization using two hundred iterations of inexact Gauss-Newton. The volume constraint is expressed as a linear equation in the unknown phase-field function $\phi_\epsilon$.

$$\int_\Omega \frac{1-\phi_\epsilon}{2} dx = \text{Total anomaly volume}$$

Figure 8A:
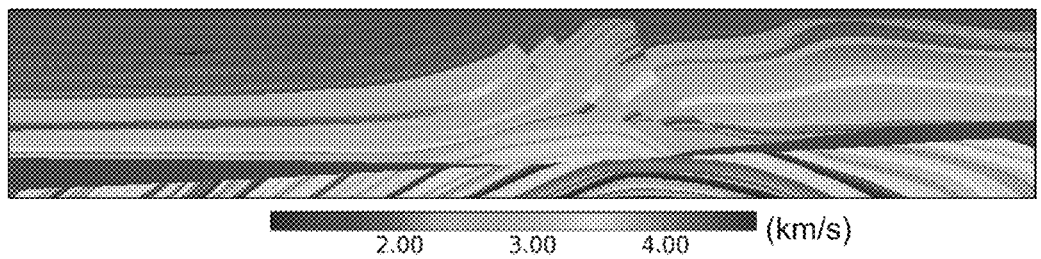
FIG. 8A illustrates an initial guess for a phase-field-based inversion technique using the fifth model, according to an embodiment of the present disclosure.

The initial guess for the unconstrained phase-field inversion technique is $\phi=-1$ and corresponds to the wave speed profile shown in FIG. 8A. The initial guess for the volume-constrained phase-field inversion technique is $\phi=-0.8780$ and corresponds to a wave speed profile visually indistinguishable from FIG. 8A. This choice of initial guess was made to ensure satisfaction of the linear volume constraint.

Figure 8B:
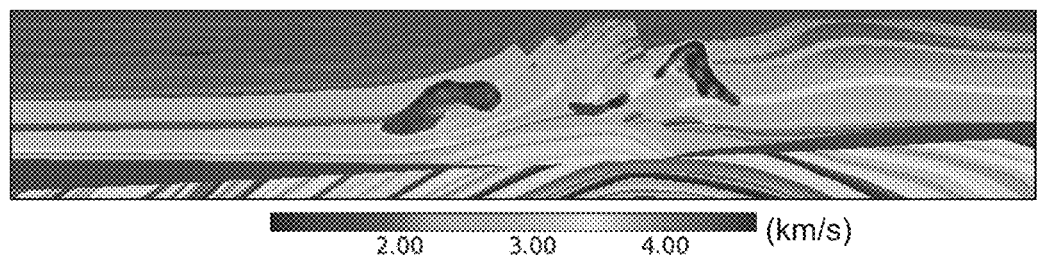
FIG. 8B illustrates the result from a phase-field inversion technique using the fifth model, according to an embodiment of the present disclosure.
Figure 8C:
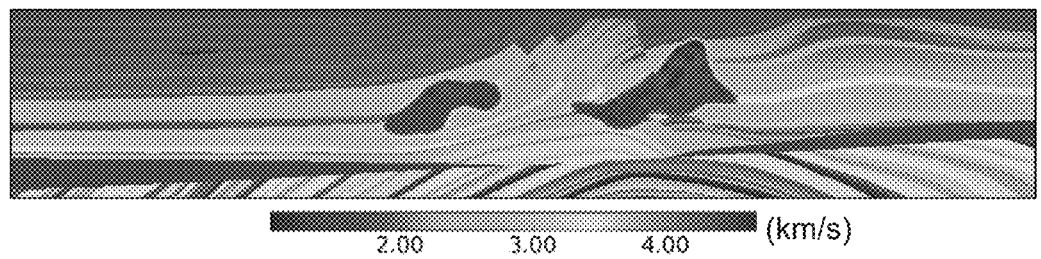
FIG. 8C illustrates the result from a phase-field inversion technique, under the additional constraint that the total volume of the two anomalies is known, using the fifth model, according to an embodiment of the present disclosure.

FIG. 8B illustrates the wave speed profile resulting from the unconstrained phase-field inversion technique. As can be seen, the phase-field inversion technique does not fully capture both anomalies. In contrast, FIG. 8C illustrates that the phase-field inversion technique constrained by the volume of the anomalies converges to a model close to the true one.

Figure 8D:
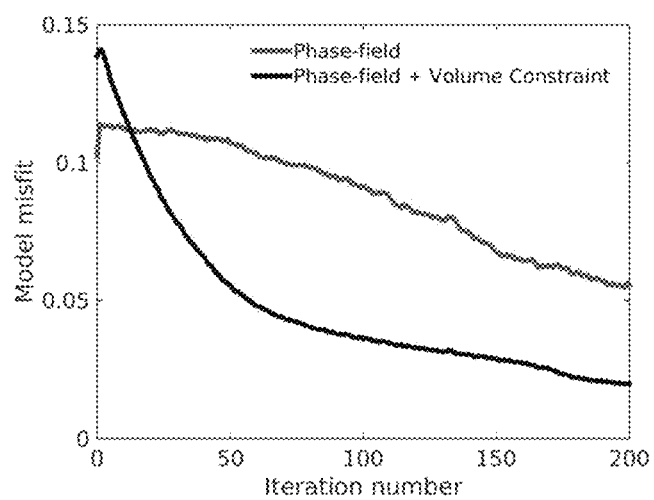
FIG. 8D compares model misfit versus number of iterations for a phase-field inversion technique and a phase-field inversion technique constrained by the volume of the two anomalies, according to an embodiment of the present disclosure.

FIG. 8D compares the model misfit versus the number of iterations for the anomaly-constrained and unconstrained phase-field inversion techniques and the cell-based inversion technique. FIG. 8D confirms that the volume-constrained phase-field inversion is closer to the true model than the unconstrained phase-field result.

It is to be appreciated that the inversion techniques described herein may be performed by a computer system. The computer system may include secondary or tertiary storage to allow for non-volatile or volatile storage of geophysical data sets, configuration settings of the inversion techniques, and data generated by the inversion techniques, such as values for geophysical parameters and geologic structures. The computer system may also include at least one display unit to display to users the data generated by the inversion techniques. The computer system may be entirely contained at one location or may also be implemented across a closed or local network, a cluster of directly connected computers, an internet-centric network, or a cloud platform. It is to be further appreciated that the inversion techniques described herein are not limited to any particular programming language or execution environment, and may be applied to any computer programming languages or logic.

ADDITIONAL EMBODIMENTS

Embodiment 1

A method for imaging a subsurface region, comprising: providing at least one geophysical data set containing data measured from the subsurface region to an objective function; optimizing the objective function to invert for an implicitly represented geologic structure of the subsurface region and at least one geophysical parameter of the subsurface region; and using a computer system to present results produced by the objective function optimization.

Embodiment 2

The method of embodiment 1, wherein the geologic structure is a boundary set including at least one interface within the subsurface region.

Embodiment 3

The method of any of the previous embodiments, wherein the geologic structure is a set of domains within the subsurface region.

Embodiment 4

The method of any of the previous embodiments, wherein the at least one geophysical parameter is structurally consistent with the geologic structure.

Embodiment 5

The method of any of the previous embodiments, further comprising adjusting a coefficient of the objective function to adjust a complexity of the geologic structure.

Embodiment 6

The method of any of the previous embodiments, further comprising decreasing a coefficient of the objective function to decrease a smoothness of the at least one geophysical parameter.

Embodiment 7

The method of any of the previous embodiments, wherein the at least one geophysical data set includes one of seismic data, time-lapse seismic data, electromagnetic data, gravity data, gradiometry data, well log data, and well pressure data.

Embodiment 8

The method of any of the previous embodiments, wherein the at least one geophysical parameter is one of a wave speed, a permeability, a porosity, an electrical conductivity, and a density.

Embodiment 9

A method for imaging a subsurface region, comprising: providing at least one geophysical data set containing data measured from the subsurface region to a Mumford-Shah-based objective function; optimizing the Mumford-Shah-based objective function to invert for at least one of the following: a geologic structure of the subsurface region and at least one geophysical parameter of the subsurface region; and using a computer system to present results produced by the Mumford-Shah-based objective function optimization.

Embodiment 10

The method of embodiment 9, wherein the geologic structure is represented by an implicit method.

Embodiment 11

The method of embodiments 9 or 10, wherein the geologic structure is a boundary set including at least one interface within the subsurface region.

Embodiment 12

The method of any of embodiments 9-11, wherein the Mumford-Shah-based objective function includes a least-squares data misfit and a Mumford-Shah functional, which is a geometric regularization.

Embodiment 13

The method of any of embodiments 9-12, further comprising: fixing the at least one geophysical parameter; and optimizing the Mumford-Shah-based objective function to invert for the geologic structure.

Embodiment 14

The method of any of embodiments 9-13, further comprising: fixing the geologic structure; and optimizing the Mumford-Shah-based objective function to invert for the at least one geophysical parameter.

Embodiment 15

The method of any of embodiments 9-14, wherein the Mumford-Shah functional is approximated by an Ambrosio-Tortorelli approximation.

Embodiment 16

The method of any of embodiments 9-16, wherein the Mumford-Shah functional is approximated by a Chan-Vese level-set approach.

Embodiment 17

A method for imaging a subsurface region, comprising: providing at least one geophysical data set containing data measured from the subsurface region to an objective function; applying a phase-field functional to optimize the objective function and invert for at least one of the following: a geologic structure of the subsurface region and at least one geophysical parameter of the subsurface region; and using a computer system to present results produced by the objective function optimization.

Embodiment 18

The method of embodiment 17, wherein the geologic structure is a set of domains within the subsurface region.

Embodiment 19

The method of embodiment 17 or 18, wherein the objective function includes a least-squares data misfit, and the phase-field functional is a geometric regularization.

Embodiment 20

The method of any of embodiments 17-19, further comprising: fixing the at least one geophysical parameter; and optimizing the objective function to invert for the geologic structure.

Embodiment 21

The method of any of embodiments 17-20, further comprising: fixing the geologic structure; and optimizing the objective function to invert for the at least one geophysical parameter.

Several embodiments of the disclosure are specifically illustrated and/or described herein. However, it is to be appreciated that modifications and variations of the disclosure are covered by the above teachings and within the purview of the appended claims without departing from the spirit and intended scope of the disclosure. Further variations are permissible that are consistent with the principles described above.

The invention claimed is:

1. A method for imaging a subsurface region, comprising:
   providing at least one geophysical data set containing data pertaining to a subsurface region to an objective function, wherein the at least one geophysical data set includes one of seismic data, time-lapse seismic data, electromagnetic data, gravity data, gradiometry data, well log data, and well pressure data;
   determining (i) an implicitly represented geologic structure of the subsurface region, wherein the implicitly represented geological structure is a portion of the subsurface which includes one or more facies or stratigraphic layers and is described through the use of one or more auxiliary functions defined in the subsurface region, and (ii) at least one geophysical parameter of the subsurface region, wherein the at least one geophysical parameter is structurally consistent with the geologic structure;
   by optimizing the objective function using gradient-based techniques, wherein the objection function is Mumford-Shah or phase-field; and
   using a computer system to display geologic structures and geophysical parameters of the subsurface region produced by the objective function optimization.

2. The method of claim 1, wherein the geologic structure is a boundary set including at least one interface within the subsurface region.

3. The method of claim 1, wherein the geologic structure is a set of domains within the subsurface region.

4. The method of claim 1, further comprising adjusting a β coefficient of the objective function to adjust a complexity of the geologic structure.

5. The method of claim 1, further comprising decreasing a coefficient α of the objective function to decrease a smoothness of the at least one geophysical parameter.

6. The method of claim 1, wherein the least one geophysical parameter is one of a wave speed, a permeability, a porosity, an electrical conductivity, and a density.

7. A method for imaging a subsurface region, comprising:
   providing at least one geophysical data set containing data pertaining to a subsurface region to a Mumford-Shah-based objective function, wherein the at least one geophysical data set includes one of seismic data, time-lapse seismic data, electromagnetic data, gravity data, gradiometry data, well log data, and well pressure data;
   optimizing the Mumford-Shah-based objective function using gradient-based techniques to determine at least one of the following: a geologic structure of the subsurface region and at least one geophysical parameter of the subsurface region wherein the at least one geophysical parameter is structurally consistent with the geologic structure; and
   using a computer system to display the geological structures and the geophysical parameters of the subsurface region produced by the Mumford-Shah-based objective function optimization.

8. The method of claim 7, wherein the geologic structure is represented by an implicit method.

9. The method of claim 7, wherein the geologic structure is a boundary set including at least one interface within the subsurface region.

10. The method of claim 7, wherein the Mumford-Shah-based objective function includes a least-squares data misfit and a Mumford-Shah functional, which is a geometric regularization.

11. The method of claim 7, further comprising:
   fixing the at least one geophysical parameter; and
   optimizing the Mumford-Shah-based objective function to invert for the geologic structure.

12. The method of claim 7, further comprising:
   fixing the geologic structure; and
   optimizing the Mumford-Shah-based objective function to invert for the at least one geophysical parameter.

13. The method of claim 7, wherein the Mumford-Shah functional is approximated by an Ambrosio-Tortorelli approximation.

14. The method of claim 7, wherein the Mumford-Shah functional is approximated by a Chan-Vese level-set approach.

15. A method for imaging a subsurface region, comprising:
   providing at least one geophysical data set containing data pertaining to a subsurface region to an objective function, wherein the at least one geophysical data set includes one of seismic data, time-lapse seismic data, electromagnetic data, gravity data, gradiometry data, well log data, and well pressure data;
   applying a phase-field functional to optimize the objective function using gradient based techniques and determine at least one of the following: a geologic structure of the subsurface region and at least one geophysical parameter of the subsurface region wherein the at least one geophysical parameter is structurally consistent with the geologic structure; and
   using a computer system to display the geological structures and the geophysical parameters of the subsurface region produced by the objective function optimization.

16. The method of claim 15, wherein the geologic structure is a set of domains within the subsurface region.

17. The method of claim 15, wherein
the objective function includes a least-squares data misfit, and
the phase-field functional is a geometric regularization.
18. The method of claim 15, further comprising:
fixing the at least one geophysical parameter; and
optimizing the objective function to invert for the geologic structure.
19. The method of claim 15, further comprising:
fixing the geologic structure; and
optimizing the objective function to invert for the at least one geophysical parameter.

\* \* \* \* \*